Figure 1:
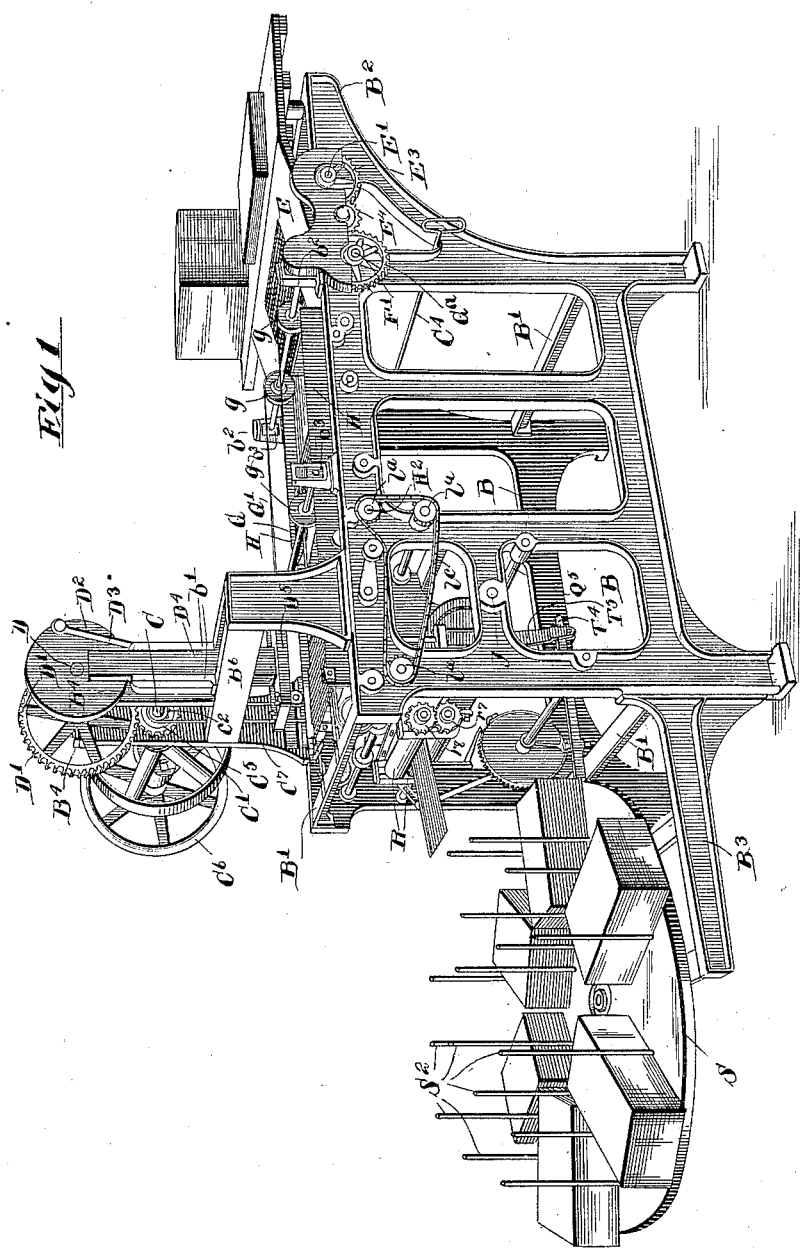

No. 705,206. Patented July 22, 1902.
R. J. CARRIER & J. W. LOW.
BOX FOLDING AND PASTING MACHINE.
(Application filed Dec. 23, 1901.)
(No Model.) 13 Sheets—Sheet 1.

Witnesses:
Carl S. Crawford
William L. Hall

Inventors
Roy J. Carrier
John W. Low
by Poole + Brown
their Attorneys

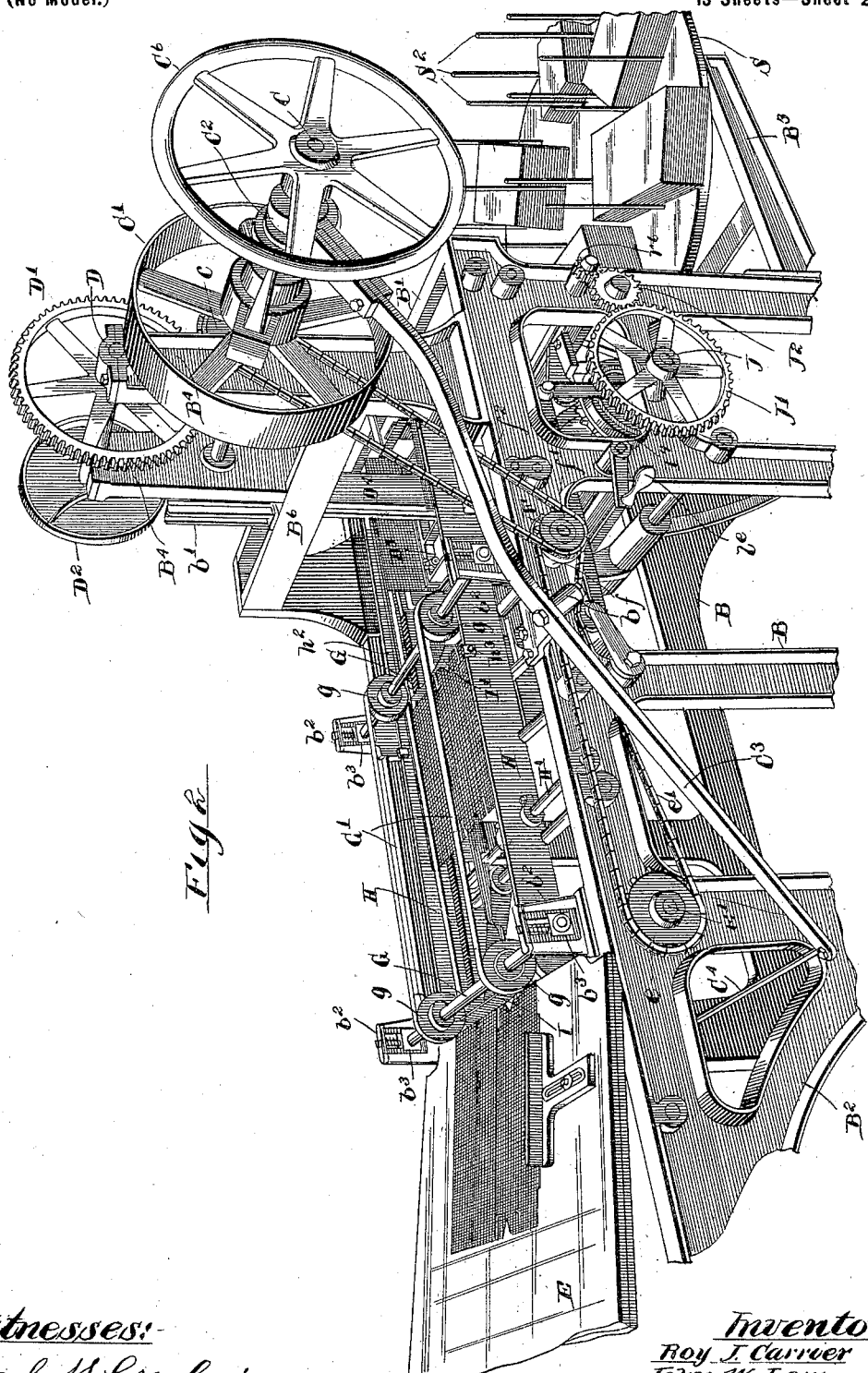

No. 705,206. Patented July 22, 1902.
R. J. CARRIER & J. W. LOW.
BOX FOLDING AND PASTING MACHINE.
(Application filed Dec. 23, 1901.)
(No Model.) 13 Sheets—Sheet 3.
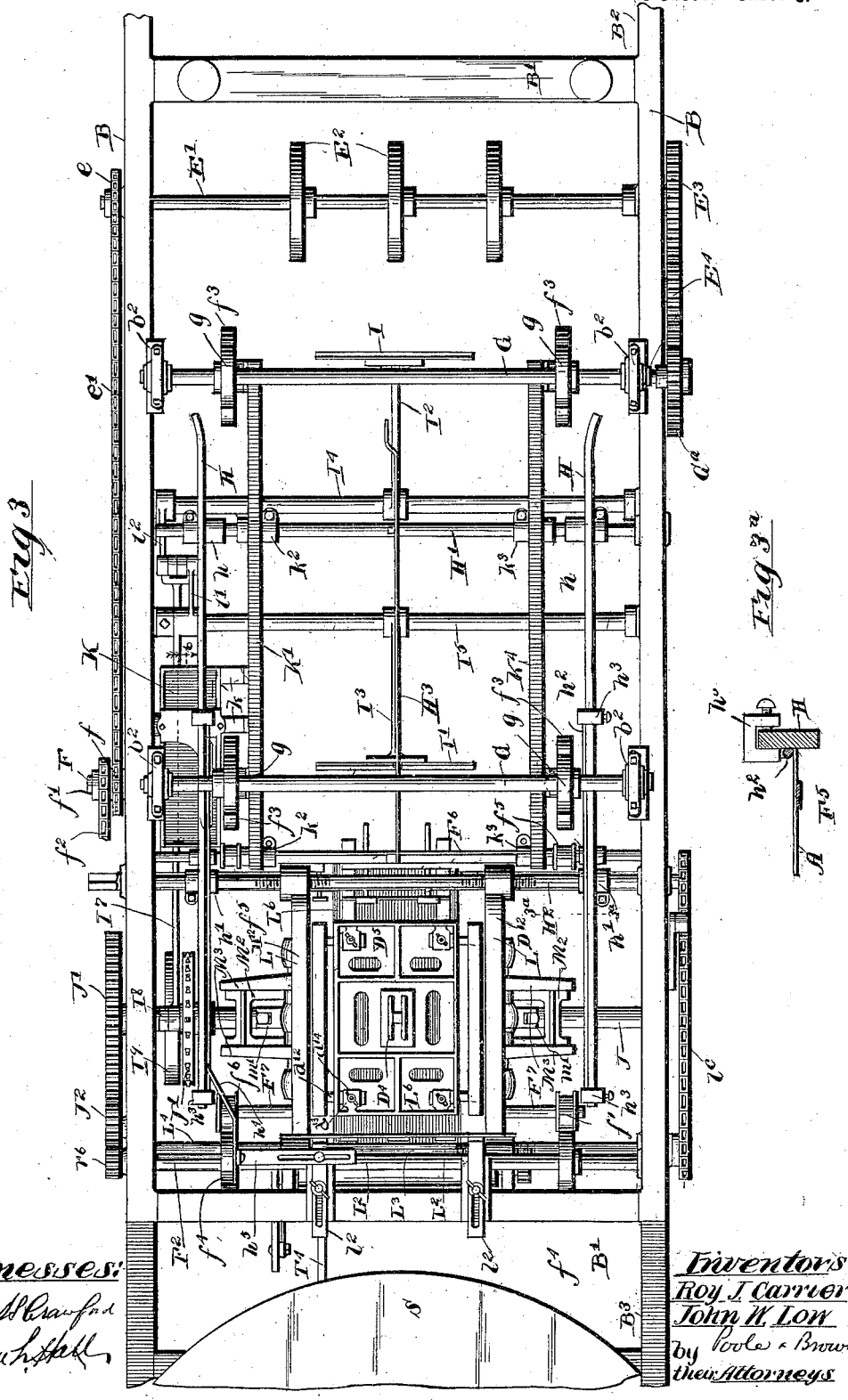
Witnesses:
Carl H. Crawford
William L. Hall
Inventors
Roy J. Carrier
John W. Low
by Poole & Brown
their Attorneys

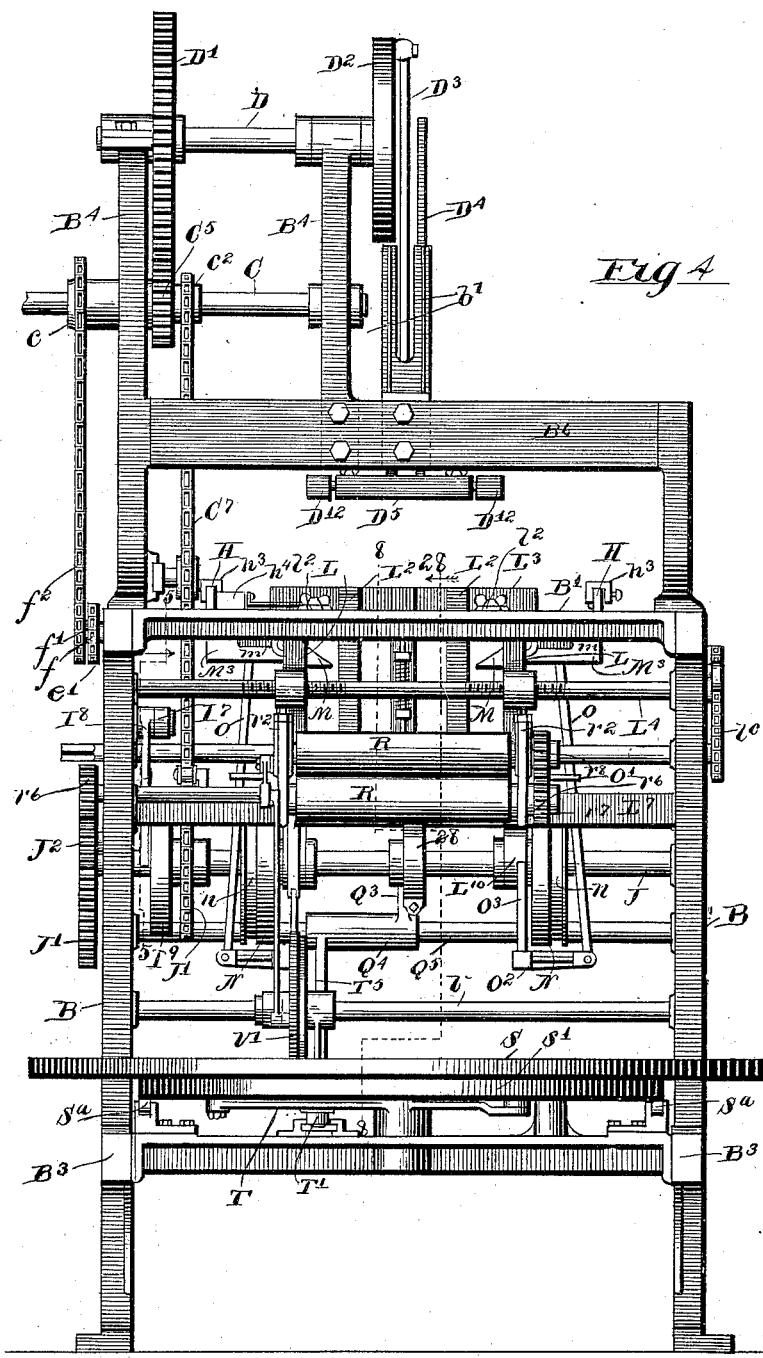

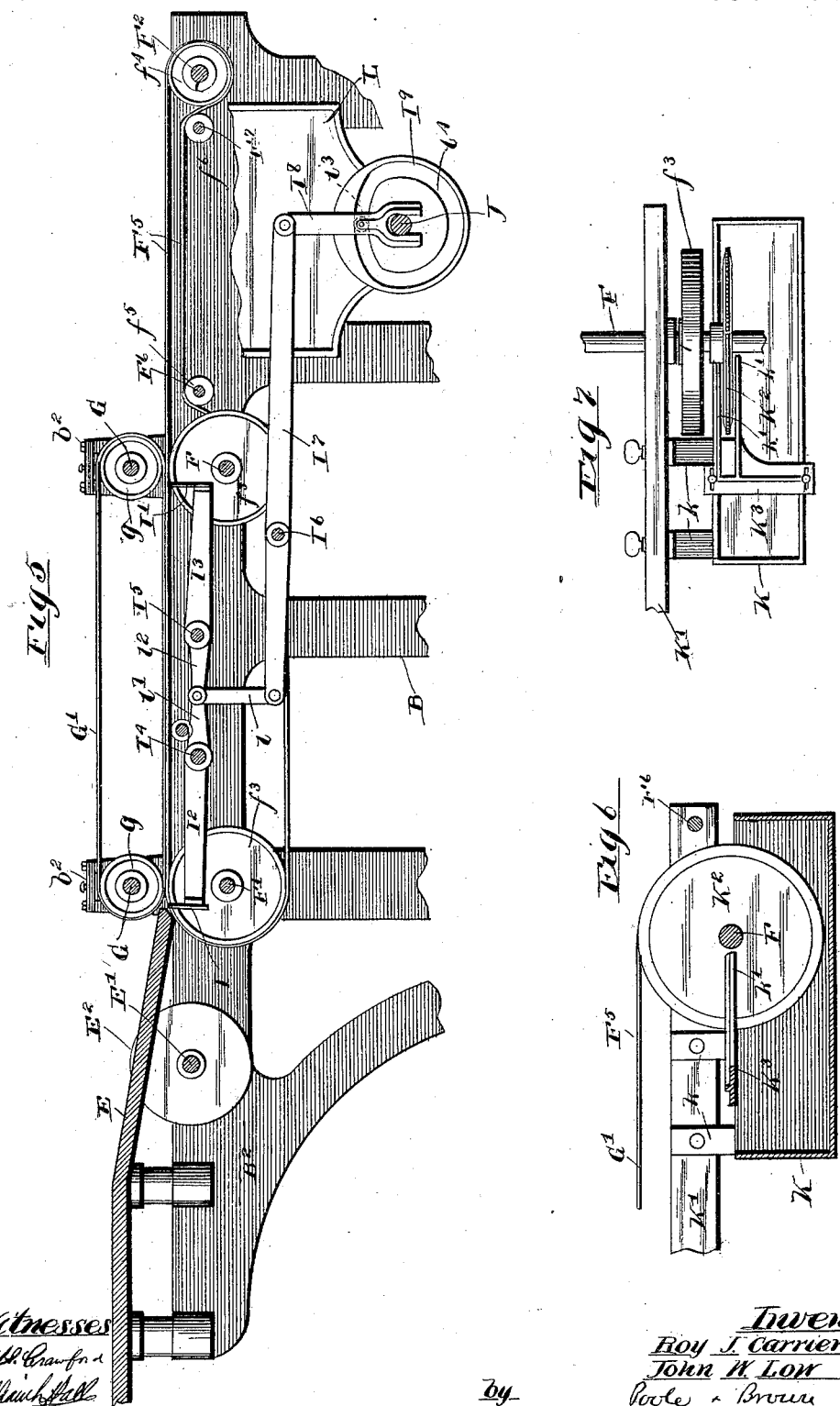

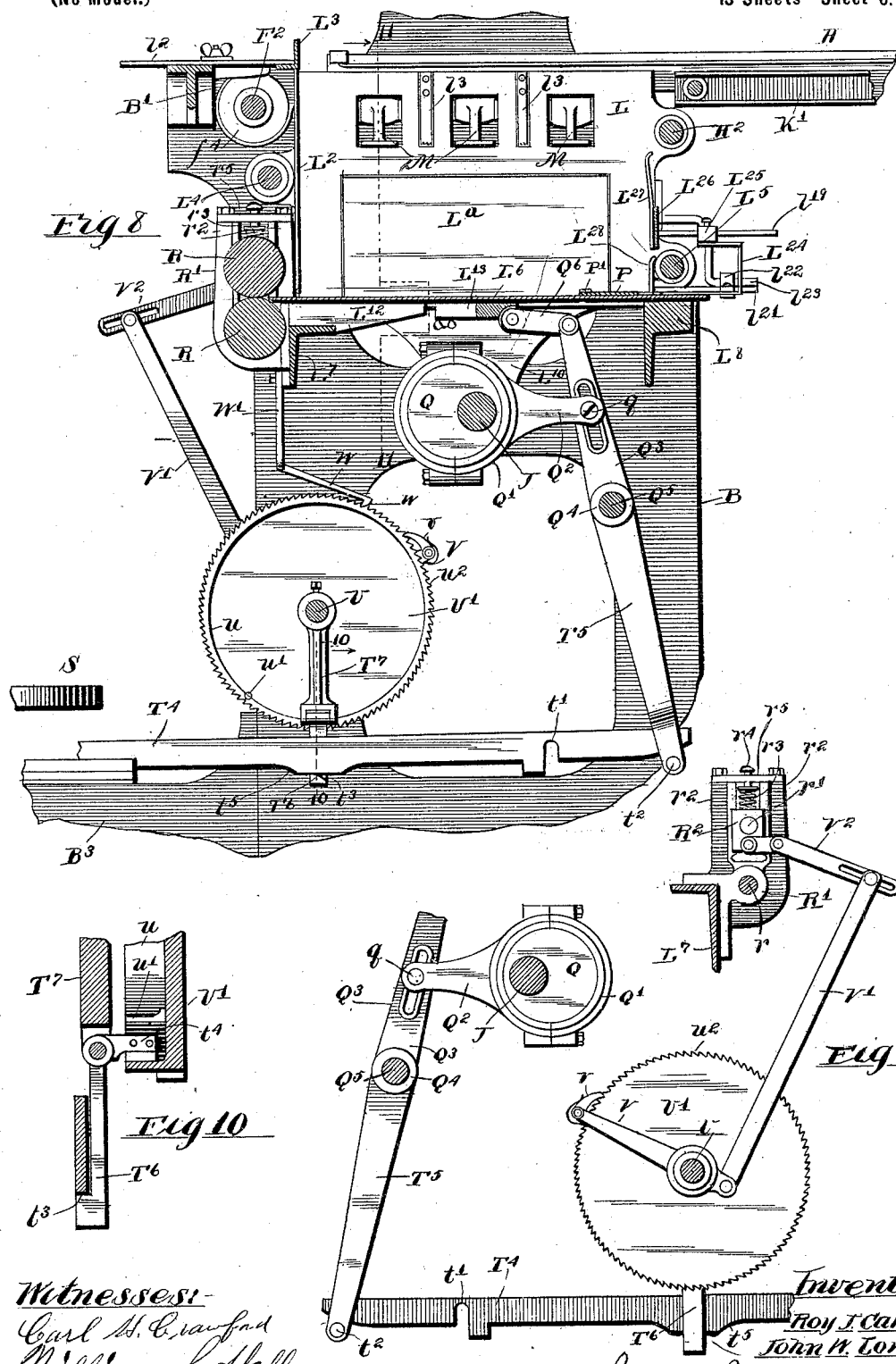

No. 705,206. Patented July 22, 1902.
R. J. CARRIER & J. W. LOW.
BOX FOLDING AND PASTING MACHINE.
(Application filed Dec. 28, 1901.)
(No Model.) 13 Sheets—Sheet 7.
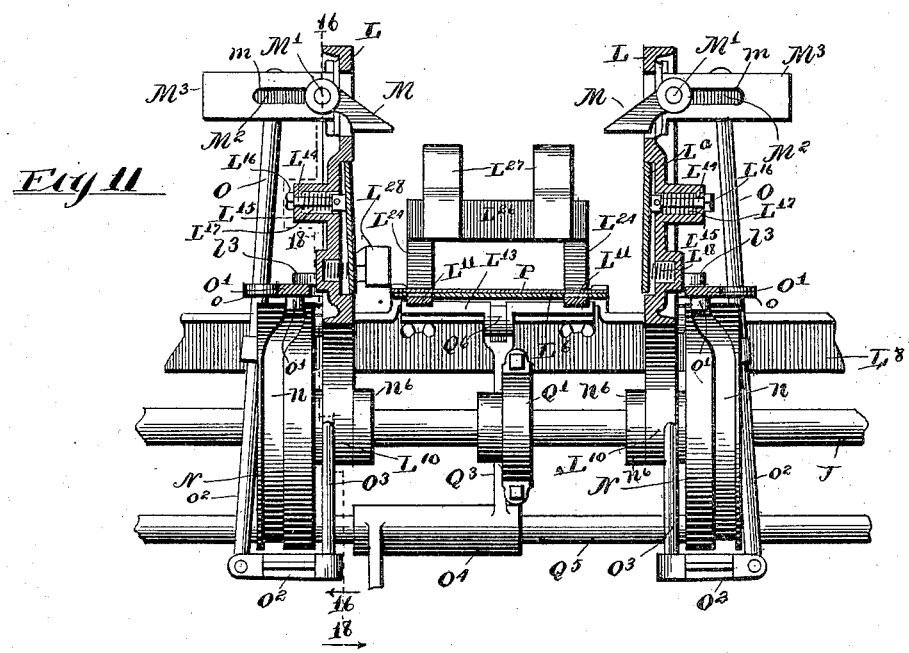
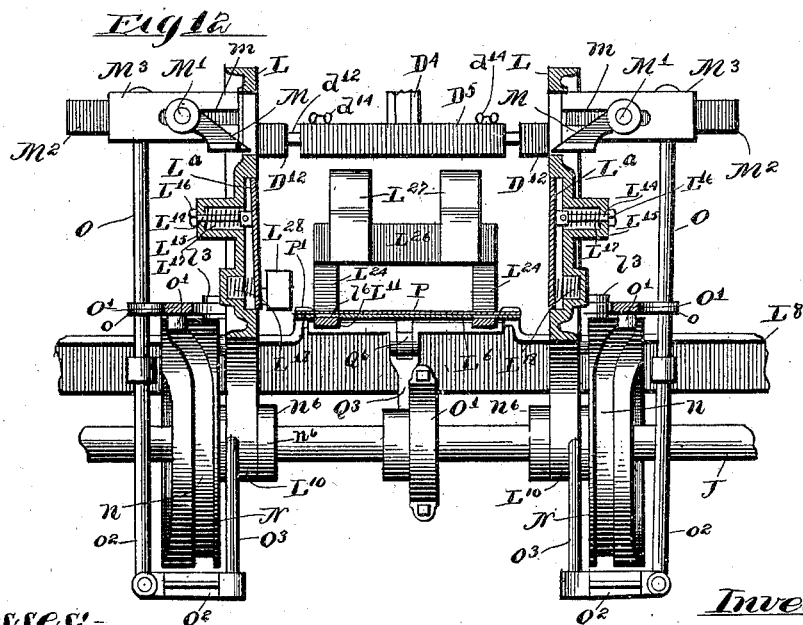
Witnesses:
Carl M. Crawford
William L. Hall
Inventors:
Roy J. Carrier
John W. Low
by Poole & Brown
their Attorneys No. 705,206. Patented July 22, 1902.
R. J. CARRIER & J. W. LOW.
BOX FOLDING AND PASTING MACHINE.
(Application filed Dec. 23, 1901.)
(No Model.) 13 Sheets—Sheet 8.
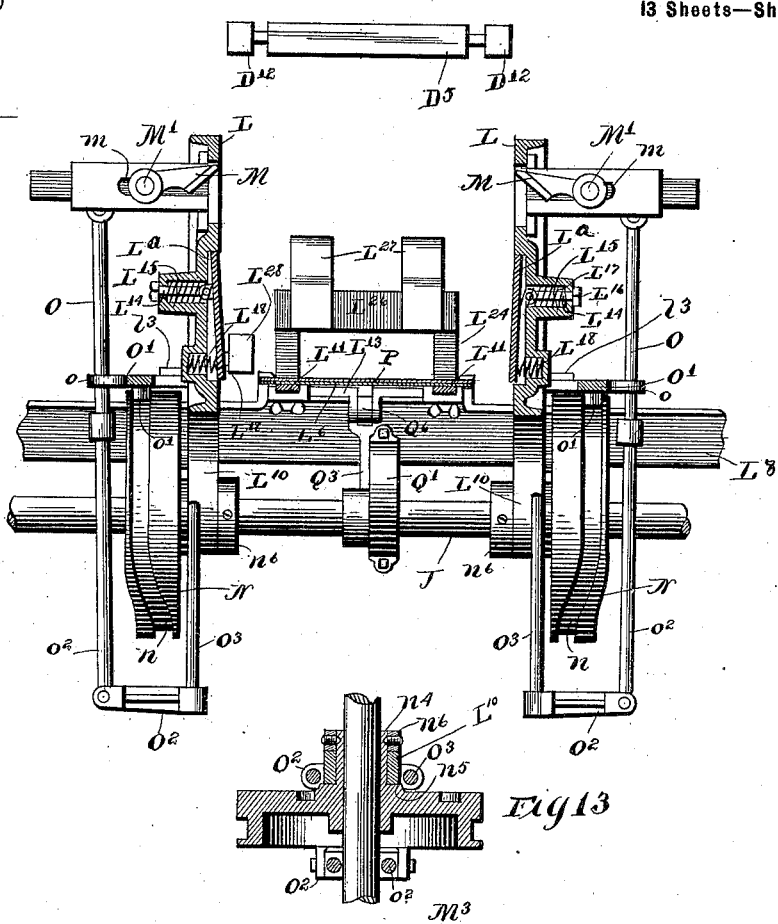
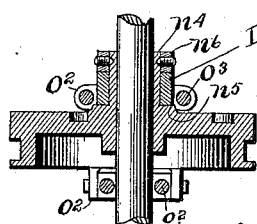
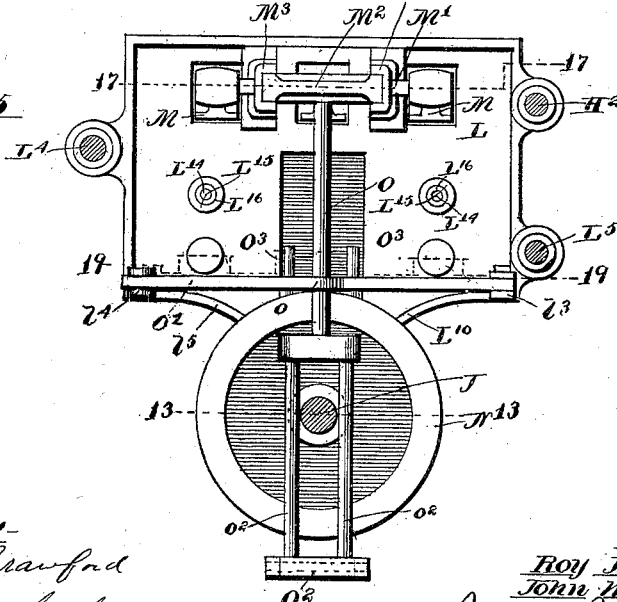

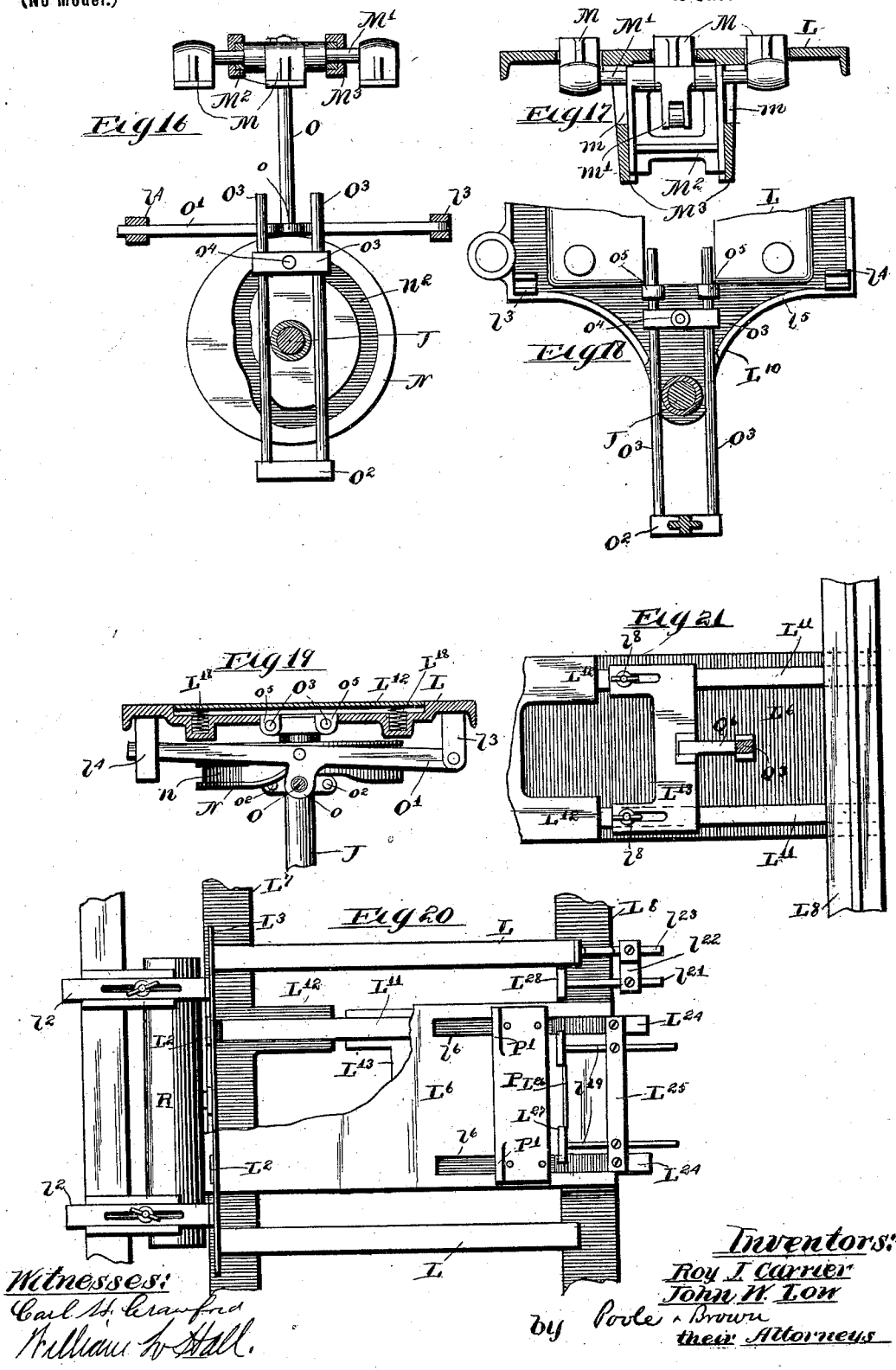

No. 705,206. Patented July 22, 1902.
R. J. CARRIER & J. W. LOW.
BOX FOLDING AND PASTING MACHINE.
(Application filed Dec. 23, 1901.)
(No Model.) 13 Sheets—Sheet 10.
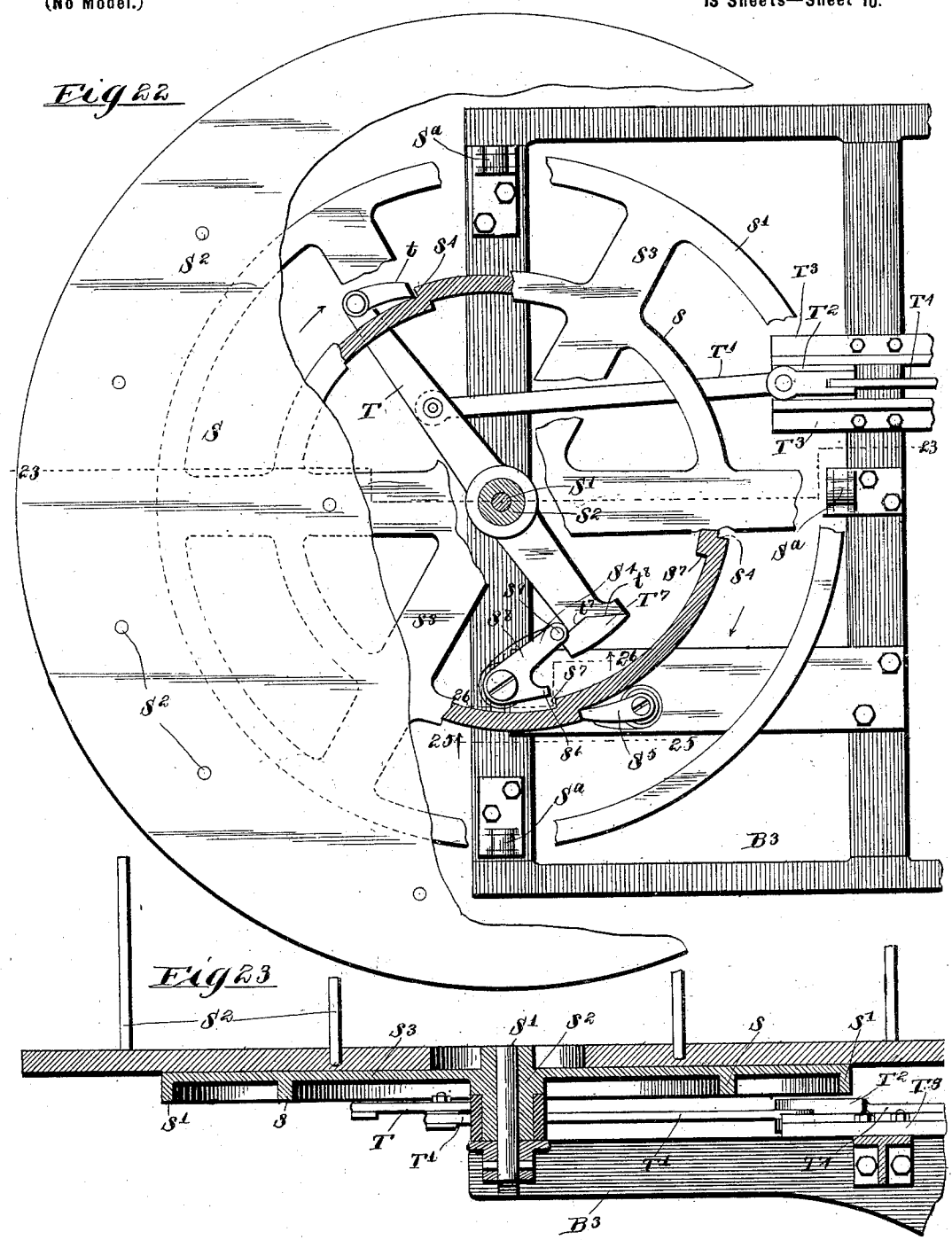

No. 705,206. Patented July 22, 1902.
R. J. CARRIER & J. W. LOW.
BOX FOLDING AND PASTING MACHINE.
(Application filed Dec. 23, 1901.)

(No Model.) 13 Sheets—Sheet 11.

Witnesses:—
Carl H. Crawford
William H. Hall

Inventors:—
Roy J. Carrier
John W. Low
by Poole & Brown
their Attorneys

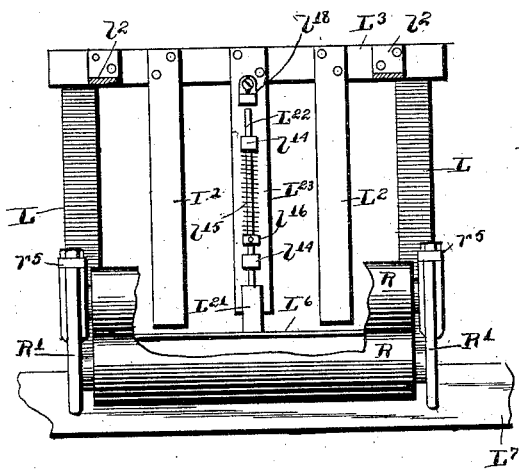

No. 705,206. Patented July 22, 1902.
R. J. CARRIER & J. W. LOW.
BOX FOLDING AND PASTING MACHINE.
(Application filed Dec. 23, 1901.)
(No Model.) 13 Sheets—Sheet 13.

Witnesses:
Carl A. Crawford
William L. Hall

Inventors:
Roy J. Carrier
John W. Low
by Poole & Brown
their Attorneys

UNITED STATES PATENT OFFICE.

ROY J. CARRIER AND JOHN W. LOW, OF CHICAGO, ILLINOIS, ASSIGNORS TO HOWE AND DAVIDSON COMPANY, OF CHICAGO, ILLINOIS, A CORPORATION OF NEW JERSEY.

BOX FOLDING AND PASTING MACHINE.

SPECIFICATION forming part of Letters Patent No. 705,206, dated July 22, 1902.

Application filed December 23, 1901. Serial No. 86,965. (No model.)

*To all whom it may concern:*

Be it known that we, ROY J. CARRIER and JOHN W. LOW, of Chicago, in the county of Cook and State of Illinois, have invented certain new and useful Improvements in Box Folding and Pasting Machines; and we do hereby declare that the following is a full, clear, and exact description thereof, reference being had to the accompanying drawings, and to the letters of reference marked thereon, which form a part of this specification.

This invention relates to improvements in box folding and pasting machines, and refers more specifically to a machine adapted to fold and paste box-blanks which have been previously scored or creased to enable them to be readily folded on the desired lines.

The machine herein shown is also provided with a suitable counting and grouping device whereby the blanks upon leaving the machine are deposited in piles or groups each containing a certain determined number.

The invention consists in the matters hereinafter set forth, and more particularly pointed out in the appended claims, and said invention will be more readily understood by reference to the accompanying drawings, in which—

Figure 24:
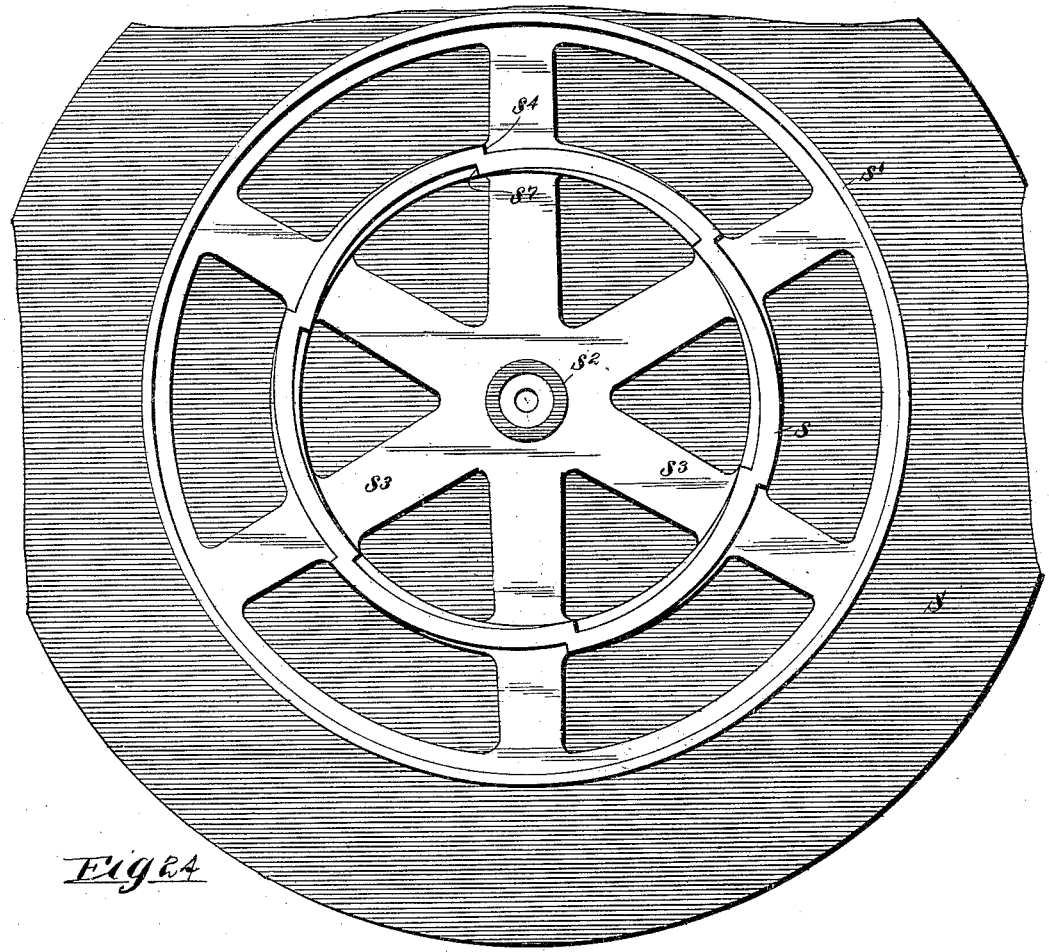
Figure 25:
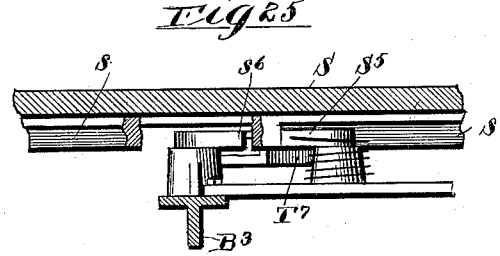
Figure 26:
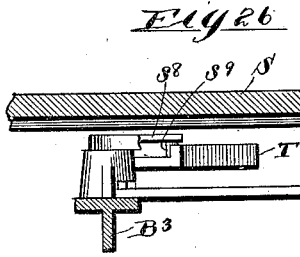
Figure 32:
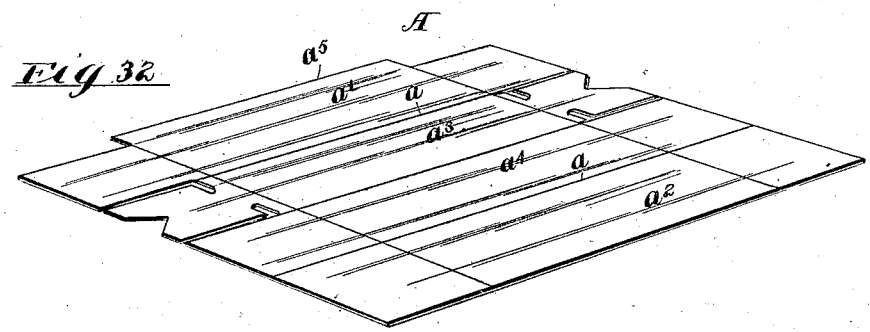
Figure 33:
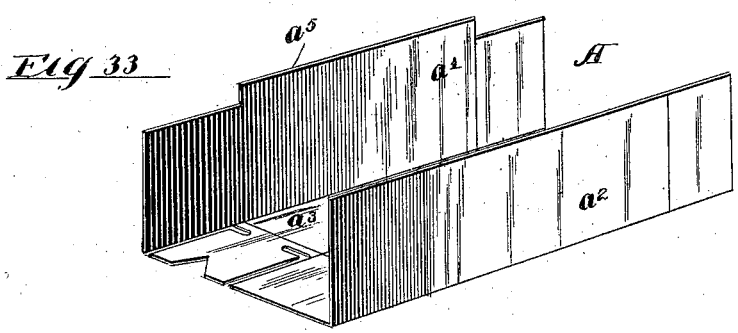
Figure 34:
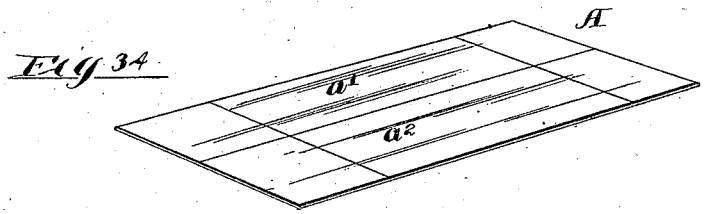
Figure 35:
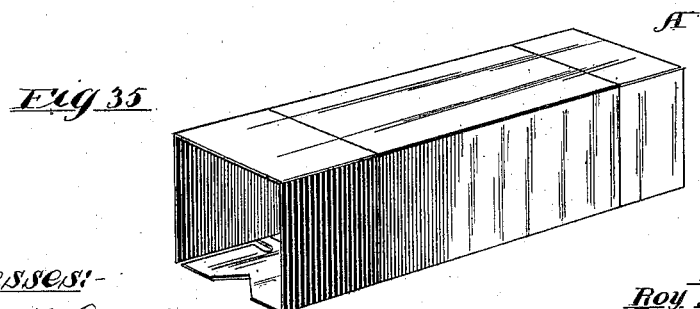

Figure 1 is a perspective view of a machine embodying our improvements. Fig. 2 is a similar view thereof, on a larger scale, taken from the opposite end of the machine from that shown in Fig. 1. Fig. 3 is a plan view of the machine-frame, showing the principal parts of the driving mechanism for giving motion to the several parts of the machine and also to the pressing and folding mechanism for folding and pressing together the pasted margins of the box-blank. Fig. 3ª is a cross-section on line 3ª 3ª of Fig. 3. Fig. 4 is a front end view of the machine. Fig. 5 is a fragmentary longitudinal section of the machine, showing the carriers for the box-blanks. Fig. 6 is a longitudinal section taken through the glue pot or box on line 6 6 of Fig. 3. Fig. 7 is a plan view of the parts shown in Fig. 6. Fig. 8 is a fragmentary vertical section taken on line 8 8 of Fig. 4. Figs. 9 and 10 are details of the counting mechanism, the latter being taken on line 10 10 of Fig. 8. Fig. 11 is a vertical section taken through the pressing and folding mechanism on line 11 11 of Fig. 8. Figs. 12 and 14 are similar views showing changed positions of the parts. Fig. 13 is a horizontal detail section taken on line 13 13 of Fig. 15. Fig. 15 is a transverse section of the construction shown in Fig. 14, taken in a plane perpendicular to the axis of the shaft J. Fig. 16 is a detail section taken on line 16 16 of Fig. 11. Fig. 17 is a horizontal section taken on line 17 17 of Fig. 15. Fig. 18 is a detail vertical section taken on line 18 18 of Fig. 11. Fig. 19 is a horizontal section taken on line 19 19 of Fig. 15. Fig. 20 is a fragmentary detail plan view of the folding and pressing chamber and some of the associated parts, the bottom wall of the chamber being broken away to show the substructure of the chamber. Fig. 21 is a fragmentary bottom plan view of the bottom wall of the receiving-chamber and parts of the ejector-device-actuating mechanism. Fig. 22 is a partial top plan view of the receiving-table, upon which the blanks discharged from the folding and pressing chamber are deposited, the table being partly broken away to illustrate the subjacent support and actuating devices. Fig. 23 is an axial section of said table and of the parts beneath the same, taken on line 23 23 of Fig. 22. Fig. 24 is a partial bottom plan view of the receiving-table and parts of the actuating and supporting devices. Figs. 25 and 26 are detail sections taken on lines 25 25 and 26 26 of Fig. 22. Fig. 27 is a fragmentary front view of the front part of the folding and pressing chamber, showing the discharging-rollers partially broken away and illustrating the devices for releasing the blanks from the chamber one at a time. Fig. 28 is a vertical section taken perpendicularly through the rollers R R in Fig. 27, the section being taken close to the bar $L^{23}$. Fig. 29 is a rear elevation of the lower end of the releasing device. Fig. 30 is a vertical section of the chamber and rollers, showing a modified construction of the chamber-walls. Fig. 31 is a vertical section taken on line 31 31 of Fig. 30. Fig. 32 illustrates one form of blank adapted to be pasted and folded, showing the same after being cut and scored. Fig. 33 illustrates the first step of folding the same. Fig. 34 illustrates the last step of the work of the machine. Fig. 35 illustrates the hollow or tubular carton after the same has been folded and pasted and opened in position for folding together the flaps which form the end walls.

Before proceeding with a description of the machine herein illustrated and embodying our improvements reference will be made to the blank A, (shown in Fig. 32,) which is adapted to be operated upon by said machine and to the manner in which it is folded and pasted. Said machine is adapted to fold said blank after the same has been previously scored and cut or provided at least with two longitudinal creases $a\ a$. The first operation of the machine is to bend or fold the side portions $a'\ a^2$ upwardly along the said score-lines $a$ at right angles to the central portions $a^3\ a^4$ in the manner indicated in Fig. 33. Previous to the folding of the blank in the manner shown in Fig. 33 and during the passage of the blank from the receiving end of the machine to the folding mechanism paste is applied to the paste-flap $a^5$ at the extreme margin of the part $a'$ of the blank. After said blank has been folded in the manner shown in Fig. 33 a secondary folding mechanism is brought into action, which folds flat the portions $a'\ a^2$ of the blank in the manner shown in Fig. 34, the section $a'$ being folded first and the other section folded thereover. The folded and pasted blanks are subjected to pressure in order to insure the adherence of the pasted parts and thereafter are discharged from the machine upon a receiving-table. The scores and cuts (shown in Fig. 32 of the drawings) for properly forming the end walls of the box are not effected by the operation of the machine herein and will be made to correspond with the particular style of box to be made.

The completed machine herein shown as embodying our improvements comprises the following general mechanisms, to wit: feed mechanism for engaging the blank and carrying it through the machine, mechanism which is operated during the transit of the blank through the machine for applying paste to the paste-flap of the blank, mechanism for folding or bending the side portions of the blank in positions at right angles to the central portion thereof, mechanism for folding downwardly the side portions of the blank upon the central portion thereof, mechanism for pressing the margin of the uppermost side portion into contact with the paste-coated portion of the underlying one, mechanism for discharging the folded blanks from the folding mechanism, and mechanism which receives the blanks after they have been discharged from the folding mechanism. As a further improvement the receiving mechanism is constructed to automatically group the completed blanks into piles or bundles, each of which contains a predetermined number. Said machine is made adjustable for the blanks of different sizes and for blanks scored at different distances apart, so as to form packages having relatively wider or narrower sides.

As shown in the drawings, the main frame of the machine consists of two generally symmetrical side portions B B, connected by upper and lower transverse connecting members B' B'. Said frame is provided at its rear end with an overhanging portion $B^2$, which forms a support for parts of the feeding mechanism and for the unfolded blanks in convenient position to be fed to the machine, and the frame is provided at its front end near its bottom with a forwardly-projecting frame $B^3$, which affords a support for the receiving-table, as will hereinafter more fully appear.

C designates the main driving-shaft of the machine, which is mounted in two upright standards or columns $B^4\ B^4$, rising from the front end of the machine-frame, and C' a driving-pulley thereon. Said driving-wheel, as herein shown, is adapted to be locked to the shaft by a clutch device $C^2$, which is actuated by an oscillatory lever $C^3$, pivoted to a stud $b$, attached to the side of the machine-frame in the manner shown in Fig. 2. To the rear or free end of the lever is attached an actuating-rod $C^4$, which extends transversely through the machine in easy access to the person feeding blanks to the machine.

D designates a counter-shaft mounted in the standards $B^4$ above and parallel with the driving-shaft. Said counter-shaft D is provided with a gear-wheel D', which meshes with a gear-pinion $C^5$ on the driving-shaft C. Attached to the end of said counter-shaft D is a crank-disk $D^2$, and said disk is connected by a pitman $D^3$ with the stem $D^4$ of a presser or plunger $D^5$, forming part of the pressing mechanism hereinafter to be described. Said stem $D^4$ reciprocates between suitable guides $b'$, which project upwardly from a horizontal transverse beam $B^6$, located transversely over the front end of the frame and which supports the innermost standard $B^4$. The main driving-shaft is provided with a hand-wheel $C^6$, by which the machine may be manually operated to bring the parts thereof into desired relative positions.

E designates an inclined feed-board located at the rear end of the machine and supported on the extension $B^2$ of the frame and from which the blanks pass to the feeding mechanism of the machine.

E' designates a horizontal shaft mounted transversely in the rear end of the frame of the machine, and said shaft carries a plurality of feed-disks $E^2$, which project upwardly through openings in the feed-board E for the purpose of carrying the blanks forwardly to the feeding mechanism to be described. Said transverse feed-shaft E' is provided at one side of the frame with a sprocket-wheel $e$, Figs. 2 and 3, which latter is rotated through the medium of a sprocket chain belt $e'$, trained over said sprocket-wheel, and a sprocket-wheel $f$, affixed to a horizontal shaft F, mounted transversely in the machine-frame in front of said shaft $E'$. Said shaft F is provided with a second sprocket-wheel $f'$ outside of the sprocket-wheel $f$, which latter is given rotation through the medium of a chain belt $f^2$, trained about the sprocket-wheel $f''$, and a sprocket-wheel $c$ on the driving-shaft C.

Next describing the feeding mechanism by which the blanks are advanced through the machine, these parts are made as follows:

G G, Figs. 2, 3, and 5, designate two horizontal parallel rotative shafts, one in front of the other, which are mounted in bearings $b^2$, rising from the side members of the frame B of the machine. Said shafts are provided near their ends inside of the side members of the machine-frame with pulleys $g$, about which are trained narrow endless belts or tapes $G'$. The transverse counter-shaft F is located vertically below the forward shaft G, and located below the rearmost transverse shaft G is a transverse rotative shaft $F'$. Said shafts F F' are provided near their ends, inside of the side members of the frame, with pulleys $f^3$, which are located vertically below the pulleys $g$.

$f^4 f^4$ designate pulleys affixed to a shaft $F^2$, mounted transversely in the frame at the front end thereof.

$F^5 F^5$ designate belts which are trained around the pulleys $f^3 f^3 f^4$. The upper laps of said belt $F^5$ come in contact with the lower laps of the belt $G'$ throughout the lengths of the latter. The blanks are delivered from the inclined feed-board E between the rearmost pulleys $g$ and $f^3$ and from thence between tapes or belts $G' F^5$ and are advanced positively by contact of said tape with the upper and lower surfaces of the margins of said blanks until they pass between the foremost pulleys $g$ and $f^3$. The upper laps of the belts $F^5$ continue forwardly of the foremost pulleys $g f^3$ to the pulleys $f^4$ and carry the blanks to and deliver the same over the folding and pressing devices, as will hereinafter more fully appear. Between the foremost pulleys $f^3$ and the pulleys $f^4$ the lower laps of the belts are trained over guide-pulleys $f^5$ $f^6$ on the inner sides of the side members of the machine, as shown in Fig. 5, the purpose of said pulleys being to deflect said lower laps of the belts out of the way of the folding and pressing devices, as will hereinafter more fully appear. The bearing-blocks $b^3$, in which the ends of the shaft G are rotatively mounted, have spring-pressed engagement with the bearing-standards $b^2$ in the manner shown in Fig. 2, whereby the upper pulleys $g$ engage with a yielding pressure the lower pulleys $f^3$, and the carrier belts or tapes are held in proper coactive relation. The pulleys $f^5$ are mounted on a fixed shaft $F^6$, extending transversely across the machine-frame, as clearly shown in Fig. 3, while the pulleys $f^6$ are mounted on short shafts $F^7$, projecting outwardly from the walls of the chamber which constitutes a part of the folding and pressing mechanism, as will hereinafter more fully appear. The carrier belts or tapes are given motion through the medium of a gear-wheel $E^3$ on the end of the shaft $E'$ outside of the machine-frame, an idle gear-wheel $E^4$ meshing therewith, and a gear-wheel $G^a$ on the adjacent end of the rearmost shaft G, as shown in Fig. 3.

H H, Figs. 1, 2, and 3, designate horizontal parallel guide-bars which are located one outside of each pair of the carrying belts or tapes $G' F^5$, said bars extending from just behind the rearmost shaft G forwardly to the forward parts of the folding and pressing mechanism. Said bars are adapted to engage the margins of the blank to properly guide the same in transit through the machine. The bars are supported at their rear ends upon a shaft $H'$, extending transversely across the machine-frame, and the forward ends thereof are supported on a shaft $H^2$, extending transversely across the machine-frame parallel with the shaft $H'$. Said guide-bars are laterally adjustable to provide for blanks of varying widths, being for this purpose provided with sleeves $h h'$, which are slipped over and are adapted to be clamped upon the shafts $H' H^2$. The forward shaft $H^2$ serves also as a support for the side walls of the folding and pressing chamber, as will hereinafter more fully appear. The blanks are supported at their intermediate portions on a horizontal bar $H^3$, Fig. 3, which is located with its upper edge in the same plane as the upper laps of the lower carrying belts or tapes $F^5$. Said guide-bars are provided on their inner faces in front of the upper belt-carriers $G'$ with downwardly-facing shoulders adapted to bear against the upper faces of the margins of the blank and prevent the same from rising and the blank from shifting after passing beyond the upper carrier-belt $G'$. As herein shown, said downwardly-facing shoulders are formed by rods $h^2$, Figs. 3 and $3^a$, which are attached to said bars by means of clamps $h^3$, adapted to be detachably affixed to the bars in the manner shown in said Fig. $3^a$.

The feeding mechanism is so arranged that the blanks are fed one at a time between the carrying-belts $G' F^5$ and are fed one at a time to and separately operated upon by the folding and pressing mechanism. While a blank is being operated upon by the folding and pressing mechanism, the blank next to be folded is held in the space between the front and rear pairs of pulleys $g$ and $f^3$, stop devices being arranged at the front and rear of said space to prevent another blank being fed into said space until the one occupying the space has been discharged therefrom and to hold therein the blank occupying said space while the folding and pressing devices are operating upon a blank which has previously passed therethrough to the folding and pressing mechanism. Said space between the forward and rearmost pairs of shafts F G and F' G may be termed an "intermediate" forwarding-space, in which the blanks are intermittingly and temporarily arrested or withheld while a blank is being operated upon by the folding and pressing mechanism. The stops for thus keeping the blanks separated in their passage through the machine consist of horizontal vertically-disposed stop-plates I I', Figs. 2, 3, and 5, which are attached to the rear and front ends, respectively, of oscillatory arms $I^2 I^3$, Fig. 5, the former affixed to a rock-shaft $I^4$, extending transversely through the machine just in front of the rearmost shafts G F', and the latter attached at its rear end to a rock-shaft $I^5$, parallel with and in front of the rock-shaft $I^4$. The rear stop-plate I is adapted to project upwardly above the lower end of the feed-board E or between the same and the intermediate forwarding-space and when in this position acts to prevent a blank passing from said board between the feed belts or tapes, and the forward stop-plate is adapted to project upwardly between said intermediate forwarding-space and the folding and pressing mechanism and acts to prevent the blank from passing out of said forwarding-space to the folding and pressing mechanism while said stop-plate is raised. The foremost stop-plate I' is centrally slitted to receive the guide strip or bar $H^3$ when the stop-plate is elevated. Means are provided which operate in unison with the folding devices for simultaneously raising the stop-plates I I'. Said actuating means are shown more clearly in Figs. 3 and 5 and are made as follows:

$I^7$ designates a vertically-oscillatory lever located just inside of one side member of the machine, which is pivoted between its ends on a short stub-shaft $I^6$, extending inwardly from said adjacent side members of the machine. Said lever is pivoted at its rear end to an upwardly-extending link $i$, which latter is pivoted at its upper end to short arms $i' i^2$, rigid with the arms $I^2 I^3$, Figs. 3 and 5. The forward end of said oscillatory lever $I^7$ is pivoted to the upper end of a vertically-reciprocatory bar $I^8$, which bar is provided on its inner face with a bearing-stud $i^3$, (shown in dotted lines in Fig. 5,) which engages a cam-groove $i^4$, formed in the side face of a rotative cam $I^9$, which is affixed on a horizontal rotative shaft J, extending transversely through the machine-frame, near the forward end thereof. Said shaft J is rotated from the main driving-shaft through the medium of a sprocket-belt $C^7$, Fig. 4, trained about a sprocket-wheel $c^2$ on said main driving-shaft and a sprocket-wheel J' on said shaft J. The lower end of the cam-bar $I^8$ is bifurcated, and the arms thereof extend on either side of the shaft J and constitute guides to hold said bar in proper vertical relation to said shaft and the cam-disk $I^9$. When the cam-stud $i^3$ of said cam-bar engages the concentric portion of the cam-groove $i^4$, the mechanism described acts to throw the stop-plates I I' upwardly above the level of the path of the blanks through the machine and acts, therefore, to arrest the movement of said blanks in the manner described, and shown in Fig. 2, and when said cam-stud engages the eccentric portion of said groove the stop-plates are thrown downwardly in the manner shown in Fig. 5 to permit the blanks to advance through the machine. It will be understood that as the machine herein shown is organized the carrier-belts travel continuously, so that when the blanks are arrested by the stop-plates the belts slip on the blanks and when the stop-plates are lowered the blanks are immediately moved forward. As before stated, said belts and stop-plates constitute intermittent forwarding devices, and so far as the scope of the invention is concerned the structural details of said devices may be considerably varied. It will also be observed that the stopping of said blanks by the plates I I', the carrier-belts moving continuously, serves to square or straighten the blanks with respect to their path in case the same should become shifted or twisted.

The pasting mechanism is so located as to apply paste to the under side of the pasting-flap $a^5$ of the blank at the time the blank is being advanced between the forward pairs of pulleys $g f^3$. Said pasting mechanism, as herein shown, is made as follows:

K, Figs. 3, 6, and 7, designates an open-topped paste-box, which is located at one side of the machine-frame adjacent to the foremost pairs of pulleys $g f^3$ and supported by means of brackets $k k$ from a horizontal bar K', extending longitudinally of the frame, parallel with the side members thereof, and supported on the shaft H' at the rear end thereof and on the shaft $F^6$ at its forward end.

$K^2$ designates a rotative paste-applying disk which is affixed to the foremost shaft F and dips into the paste-box K, which latter is adapted to be partially filled with paste. Said paste-applying disk $K^2$ is made of the same diameter as the adjacent pulley $f^3$ and is located outside of said pulley, so as to engage the under face of the pasting-flap $a^5$. The margin of said paste-applying disk is tapered or beveled in the manner shown, so as to apply a thin line of paste to said paste-flap, and being made of the same diameter as the adjacent pulley $f^3$ has a rolling contact with said flap.

$K^3$ designates a scraping device consisting of a plate extending across and attached to the upper margins of said paste-box and provided with arms $k' k'$, which extend on either side of the paste-applying disk and serve to prevent an accumulation of paste on the sides of said disk. The forward margin of said plate $K^3$ between said arms is located closely adjacent to the periphery of the disk, so as to prevent undue accumulation of paste on said periphery. Said plate $K^3$ has slotted connection with the glue-box, as shown in Fig. 7, thereby permitting the plate to be moved toward and from the disk, so as to regulate the supply or charge of paste carried by the disk to the blank. It will be noted that said paste pot or box is located in such relation to the foremost pulleys $f^3$ $g$ of the carrying mechanism that the paste-wheel applies paste to the blank just as it is passing between the wheels $f^3$ $g$. This is a feature of considerable practical importance, for the reason that the blank is stiffened by the pressure of the pulleys and is sufficiently rigid to prevent the blank buckling or being moved out of contact with the paste-disk. The bar K', to which the paste box or pot is attached, is movable laterally of the machine, being for this purpose provided with sleeves $k^2$, which are slipped over and slide on the supporting-shafts H' $F^6$. In this manner we are enabled to adjust the paste box or pot to varying widths of blanks by shifting the bar inwardly or outwardly, as the case may be. Said bar is also connected with the pulleys $f^3$ and $g$ and the guide-pulleys $f^5$, so that said pulleys and the paste-box may be simultaneously adjusted. The pulleys $f^3$, $g$, and $f^5$ at the other side of the machine are likewise adjusted by means of an attached bar $K^4$, like the bar K', and affixed to the shafts H' $F^6$ by means of adjusting-sleeves $k^3$.

Next referring to the folding mechanism, whereby the side parts $a'$ $a^2$ of the blank are first folded upwardly in the manner shown in Fig. 32 and are afterward folded inwardly upon each other in the manner shown in Fig. 33, and to the mechanism for pressing the pasted parts one upon the other, said mechanisms are shown in Figs. 3, 4, and 11 to 21, inclusive, and are made as follows: The blank after leaving the foremost pairs of pulleys $g$ $f^3$ and receiving a supply of paste is delivered by the carrier belt or tape $F^5$ over the open top of a chamber or box consisting, essentially, of side walls L L, Figs. 3, 11, 12, 14, and 15, herein shown as made of cast metal, two vertical bars $L^2$ $L^2$, Figs. 4 and 8, which extend vertically across the front of the box and are attached at their upper ends to a stop-bar $L^3$, which latter limits the forward movement of the blank over said chamber, said blanks being carried forwardly by the belts or tapes $F^5$ until the forward margins thereof strike the stop-bar $L^3$. Said stop-bar $L^3$ is attached to the upper front transverse member B' of the frame of the machine by means of thumb-screws which pass through slotted forwardly-extending arms $l^2$, formed on or attached to said stop-arm or plate, in the manner shown in Figs. 3, 4, and 8. In this manner the stop-bar and the vertical end bars of the chamber may be shifted rearwardly or forwardly, and thereby adapt the chamber to longer or shorter blanks, as desired. The side plates L of said chamber are supported on transverse rods $L^4$ $L^5$ and the rod $H^2$, hereinbefore referred to, the former rod $L^4$ extending transversely between the side members of the frame and passing through apertured projections on the forward margins of said plates and the latter rods $L^5$ $H^2$, located one vertically over the other, extending also between the said side members of the frame and passing through projections formed on the rear margins of said plates. The chamber is adjustable as to width, the side members or plates L thereof being for this purpose movable toward and away from each other. As a means for effecting this result the supporting-rods $L^4$, $L^5$, and $H^2$ are rotative and are provided with right and left hand screw-threads, which engage screw-threaded openings in the projections on the margins of said plates L. Desirably the rods are so connected as to be simultaneously rotated to effect such lateral adjustment of the walls of the chamber. For this purpose the adjacent ends of said rods at one side of the machine are provided with sprocket-wheels $l^a$, as shown in Fig. 1, which gear-wheels are connected by a sprocket-belt $l^c$, and the opposite end of one of the shafts (the shaft $H^2$, as herein shown) is extended past the side of the machine-frame and is adapted for attachment thereto of a manually-movable member, such as the crank $l^e$, as shown in Figs. 2 and 3. The bottom of said chamber consists of a horizontal plate $L^6$, which is supported at its front and rear ends upon transverse bars $L^7$ $L^8$, Figs. 8 and 20, which transverse bars are adapted to be fastened at their ends in any suitable manner to the side members of the machine-frame.

In the operation of the machine the chamber is filled with folded blanks to a given level, and as the blanks are delivered to the top of the chamber and folded a folded and pasted blank is discharged from the bottom of said chamber, as will hereinafter more fully appear. The side walls of the chamber are so arranged and adjusted with respect to the score-lines $a$ of the blank that said score-lines when the blank is delivered over the chamber by the carrier belts or tapes $F^5$ are in line with the inner surfaces of the side plates of the chamber, the guide-bars H being depended upon to hold the blanks properly in place. In case the blank should become shifted or out of proper alinement when it arrives over the folding-chamber a gage $h^4$ is provided, which is located at one side of said chamber adjacent to one of the guide-bars and is adapted to contact with the forward edge of the paste-flap of the blank as the latter is delivered over the chamber, and thereby straighten said blank. Said gage is attached to a horizontal bar $h^5$, which has slotted connection with the adjacent adjusting-bar $l^2$ of the stop-bar $L^3$, as shown in Fig. 3. Said slotted connection enables the gage to be adjusted toward and from the chamber to suit different widths of blanks, and said gage is adjusted from front to rear of the machine when the stop-bar $L^3$ is adjusted. When a blank has been delivered to a position over the chamber in the manner described, the plunger $D^5$ is depressed and presses the intermediate portion of the blank into the chamber upon the subjacent bundle of blanks contained in said chamber and breaks or folds the blank along the score-lines $a$, at the same time folding the side parts of the sections thereof upwardly at right angles to the intermediate sections or parallel with said side plates of the chamber. The plunger $D^5$ is thereafter lifted out of the chamber, and in order to prevent the folded blank rising from the chamber with the plunger the inner faces of the side walls of said chamber are provided with a plurality of retaining-strips $l^3$, Fig. 8, which are attached at their upper ends to said side walls and the lower or free ends of which are desirably serrated and extend when free or unconfined obliquely inwardly toward the center of the chamber. With this construction when the plunger is withdrawn from the chamber the tendency of the plunger to withdraw the blank from said chamber by frictional contact with said plunger is counteracted by the strips $l^3$ engaging the outer surfaces of the upturned side portions of said blank.

After the blank has been folded in the manner described, and shown in Fig. 33, and the plunger withdrawn the side portions $a'$ $a^2$ of said blank are thereafter folded together, with the margin of the part $a^2$ overlying the paste-coated flap $a^5$. The mechanism for effecting the secondary folding operation is made as follows:

M M designate a plurality of fingers, which are adapted to be projected through openings in the side plates of the folding and pressing chamber, near the upper margins thereof. Three fingers are shown at each side of the chamber. Said fingers are affixed at their outer ends to short horizontal rock-shafts $M'$, which are journaled in horizontally-movable bearing-blocks $M^2$, (shown more clearly in Figs. 16 and 17,) and said blocks have sliding engagement with laterally and oppositely extending brackets $M^3$, (shown also in Figs. 11, 12, and 14,) attached to the outer sides of the plates L, whereby said fingers may be moved bodily toward and away from said chamber, as well as being capable of a vertically-swinging movement. Said brackets are provided with horizontal slots $m$, through which the shafts $M'$ extend. The intermediate finger of each set is located between the arms of the brackets $M^3$ and the outer fingers are located at the sides of said brackets. Said fingers are adapted to be retracted from the folding and pressing chamber at the time a blank is delivered over said chamber and just prior to the descent of the plunger $D^5$, thereby clearing said chamber for the reception of the blank and plunger. This position of the fingers is shown in Fig. 12. As the plunger is retracted the inner ends of the fingers are swung upwardly into the positions shown in Fig. 14, and when said plunger has been fully retracted the said fingers are shifted bodily inwardly, and at the same time the inner ends thereof are swung downwardly into the positions shown in Fig. 11, and during this inward and downward movement of the fingers said fingers engage the upwardly-folded side portions of the blank and fold the same downwardly in the manner shown in Fig. 34. The mechanism is so timed that the set of fingers at one side of the chamber engage the upturned side section of the blank on which the paste-flap is formed a short time prior to the engagement of the other side section by the other set of fingers, whereby the paste-flap section is turned under the opposite section of the blank. While the side portions of the carton are being folded downwardly in the manner last described another blank is delivered upon the top of the chamber to be pressed into said chamber in the next descent of the plunger, said fingers M being withdrawn into the positions shown in Fig. 12 just prior to the next descent of the plunger. As the blanks are pressed into the chamber in the manner described the lowermost of the blanks is discharged from the chamber in a manner hereinafter to be described, so that a certain number of blanks remains constantly in the chamber. Moreover, each of said blanks after being folded in the manner shown in Fig. 34 is repeatedly subjected to the pressure of the plunger in its successive descents until said blank is discharged from the chamber, thereby insuring the adherence of the pasted parts of the blanks. The mechanism for effecting the various movements of the folding-fingers described is shown in Figs. 11 to 19 and is made as follows:

N N designate two rotative cams, which are affixed to and rotate with the shaft J, said cams being located outside of the folding and pressing chamber, one on each side thereof. Said cams are provided on their peripheries with cam-grooves $n$ and on their inner or adjacent faces with other cam-grooves $n^2$, the latter being shown in Fig. 16. Actuating devices are provided which have parts coöperating with said cam-grooves in the cams N for giving bodily and swinging motion to said fingers in the manner before set forth. Said actuating devices are made as follows:

O O designate vertically-disposed actuating-rods for said folding-fingers, which are operated by the cams N. Said rods are pivoted at their upper ends to rigid outwardly-extending arms $m'$, affixed to the rock-shafts $M'$, as shown in Fig. 17, and extend at their lower ends through apertured projections $o$ in horizontally oscillatory cam-levers $O'$, located one above each of the cams N, outside of the adjacent side plate L of the folding and pressing chamber. The actuating-rods are pivoted at their lower ends, as will hereinafter more fully appear, in such manner that their upper ends may swing toward and away from the sides of the pressing-chamber, and thereby bodily move said fingers toward and away from the chamber. Each of said cam-levers is pivoted at one end to a laterally-directed arm or bracket $l^3$, attached to the lower side and at the rear part of the adjacent plate L, as clearly shown in Figs. 15 and 19, and slides at its other end between upper and lower guide-arms $l^4$, attached to the opposite side of said plate L. Said horizontal cam-levers O' are provided between their ends with downwardly-projecting cam-studs $o'$, Figs. 11, 12, and 14, which are adapted for engagement with the peripheral cam-grooves $n$ of the cams N. Said actuating-rods O are bifurcated at their lower ends, the arms $o^2$ $o^2$ thereof passing on opposite sides of the shaft J in the manner shown in Fig. 15. Said arms $o^2$ of the actuating-rods O are pivoted at their lower ends to horizontal brackets $O^2$, which are rigidly affixed to the lower ends of parallel bars $O^3$ $O^3$, which latter extend upwardly inside the cams N and constitute that part of the actuating mechanism for the fingers which coöperates with the inner cam-grooves $n^2$ for vertically swinging or vibrating said fingers in the manner described. Said parallel rods $O^3$ are connected near their upper ends by transverse bars $o^3$, Figs. 16 and 18, and said bars are provided with outwardly-projecting cam-studs $o^4$, which have engagement with the inwardly-facing cam-grooves $n^2$ of the adjacent cams N. Said rods $O^3$ have sliding engagement at their upper ends with guide-lugs $o^5$, projecting inwardly from the adjacent side plates of the folding and pressing chamber, as shown in Fig. 18. With this construction the cam-levers O' are vibrated inwardly and outwardly by operation of the cam-studs $o'$ in the grooves $n$ of the cams N, and this movement is imparted to the actuating-rods and therethrough to the fingers M to move the same bodily inwardly and outwardly and thrust the same into and retract them from the chamber, and said actuating-rods O are given vertically reciprocatory motion from the inner cam-grooves through the bars $O^3$ and the bracket $O^2$ and act to swing said fingers on their axes. When the cam-studs $o'$ occupy the inwardly-deflected parts of the cam-grooves $n$, the rods O are swung inwardly to thrust the fingers into the folding and press chamber, and said cams are notched or cut away on their peripheries, as shown in Figs. 11, 12, and 14, to permit said rods to swing inwardly. When said cam-studs occupy the straight portions of said grooves, the actuating-rods O are swung outwardly to retract the folding-fingers, as shown in Figs. 12 and 14. Furthermore, when the cam-studs $o^4$ occupy the concentric portions of the cam-grooves $n^2$ the finger-actuating mechanism is shifted upwardly and acts to swing the inner ends of the fingers downwardly, as shown in Figs. 11 and 12, and when occupying the eccentric parts of said cam-grooves said actuating mechanism is shifted downwardly to swing the inner ends of the fingers upwardly, as shown in Fig. 14.

The cams and the finger-actuating mechanism coöperating therewith are arranged in two like sets, one being a duplicate of the other, and each set is supported on one of the side plates of the folding and press chamber. As provision has been made for moving said side walls toward and away from each other to vary the width of the press-chamber, it is also necessary that said movement shall carry with said side plates the cams and finger-actuating mechanism described. For this purpose the plates are provided inside the cams N with downwardly-extending parts $L^{10}$, which are apertured for the passage of the shaft J, as shown in Figs. 11, 12, 14, and 18. The cams are provided with inwardly-projecting hubs $n^4$, which extend through the apertures in said extensions of the plates L around the shaft J. Said hubs are provided outside of said extensions with shoulders $n^5$, against which the extensions $L^{10}$ bear, as shown in Fig. 13, and are provided on the inside of said extensions with collars $n^6$, attached to said hubs by set-screws or like means, said extensions of the plates being thus locked between said collars and the shoulders of the hubs, thereby serving to connect the cams with said plates in such manner that the cams and fingers actuating mechanism move with the plates. The outer faces of the said extensions $L^{10}$ are provided with flanges $l^5$, as indicated in Fig. 18, and the lower ends of said flanges are cut away to permit the parallel rods $o^3$ of the finger-actuating mechanism to pass upwardly between the extensions and the cams.

As before stated, when the machine is in operation the folding and press chamber is adapted to be filled with blanks, said blanks receiving the pressure of the plunger each time the latter descends. In each operation of the machine the bottom blank of the series in the chamber is removed or ejected from said chamber, a new blank being added to the top of said pile or series in each operation, so that after the chamber has been once filled the number of blanks in the chamber remain the same.

The mechanism for removing or ejecting the lower blank from the chamber in each operation of the machine is made as follows: P designates a pusher-plate, which extends transversely across the bottom plate $L^6$ of the press-chamber and projects above said bottom plate. Said pusher-plate is connected through slots $l^6$ in said bottom plate, Fig. 20, with guide-bars $L^{11}$, which extend transversely between the supporting members $L^7$ $L^8$ of the bottom of said chamber. Said bars $L^{11}$ have sliding engagement at their forward ends with inwardly-extending grooved lugs $L^{12}$, projecting rearwardly from said transverse member $L^7$ in the manner shown in Figs. 8, 20, and 21, and the rear ends of said bars engage upwardly-opening grooves in the rear cross members $L^8$, as shown in Fig. 20. In Fig. 20 the pusher-plate is shown in its forwardmost position. The pusher-plate is provided on its upper surface with one or more upwardly-projecting lugs or ribs P', which engage the rear margin of the lowermost blank when the plate is moved forwardly to force said blank forwardly, and said plate has sufficient movement in the chamber to force said blank forwardly sufficiently to bring the forward margin thereof between upper and lower delivery rollers R R, located transversely in front of the chamber, at the lower side thereof. Said rollers grasp the blank and act to draw or pull the same outwardly from the chamber. Said pusher-plate is moved forwardly to eject the bottom blank from the chamber just after the plunger is moved upwardly in each operation of the machine. The means for actuating said pusher-plate consist in this instance of the following devices: Q, Figs. 8, 9, 11, 12, and 14, designates an eccentric which is mounted on the shaft J, midway between the cams M. Q' designates an eccentric-strap secured to said eccentric in a familar manner and provided with a rigid arm $Q^2$. $Q^3$ designates a vibratory arm which is attached to or formed on a sleeve $Q^4$, which surrounds a shaft $Q^5$, extending transversely between and attached to the side members of the machine-frame below and in rear of the shaft J. The arm $Q^2$ of said eccentric-strap has slotted connection with said vibratory arm to permit of variation of the amplitude of movement of the arm, said eccentric-arm being provided with a pivot-stud $q$, which engages a longitudinal slot in said arm. The upper end of said vibratory arm $Q^3$ is pivoted to one end of a link $Q^6$, the other end of which link is pivoted to a transverse plate or bar $L^{13}$, Fig. 21, which extends between and is attached at its opposite ends to the under faces of the guide-bars $L^{11}$, below the bottom plate of the chamber, in the manner shown in Figs. 8 and 21. Said plate or bar $L^{13}$ is adjustable from front to rear of the chamber with respect to the guide-bars $L^{11}$, being for this purpose provided with slots through which extend thumb-screws $l^8$, by which said plate is attached to said bars. The purpose of this adjustable connection is to vary the movement of the pusher or ejector plate to adjust the same to blanks of different lengths, and thereby insure that the blanks be advanced sufficiently to bring the same under the influence of the discharging-rollers R. The trunnions $r$ of the lower discharge-rollers are rotatively mounted in stationary bearings R', affixed to the forward transverse frame member $L^7$, which supports the bottom of the box, as shown in Fig. 9, and the trunnions $r'$ of the upper rollers are rotatively mounted in bearing-blocks $R^2$, Fig. 9, which are located between vertical guide-arms $r^2$, formed on the bearing-castings R', whereby said upper roller is capable of vertical movement with respect to the lower roller to permit the folded blanks, which are of considerable thickness, to pass between said rollers. The upper roller is pressed downwardly against the lower roller by means of spiral springs $r^3$, which surround short vertical pins $r^4$, projecting upwardly from said guide-blocks, and through transverse bars $r^5$, extending transversely between and attached to the upper ends of the guide-arms $r^2$ of the bearing R'. One of the trunnions $r$ of the lower roller is extended outwardly beyond the side of the machine-frame, as is shown in Figs. 1, 2, 3, and 4, and said extended trunnion is provided outside of said frame with a gear-pinion $r^6$, which is rotated from a gear-wheel J' on the shaft J through the medium of an intermediate idler-gear $J^2$, rotatively mounted on a stub-shaft at the side of the machine-frame in the manner shown in Fig. 2. The ends of said trunnions $r\ r'$ remote from the lower extended trunnion $r$ are provided with intermeshing gear-pinions $r^7\ r^8$, as clearly shown in Figs. 1 and 4, whereby rotation of the lower roller is positively transmitted to the other roller. The springs $r^3$, by which the upper roller is held pressed against the lower roller, are made of considerable strength, so that when the blanks pass between said rollers they are subjected to considerable pressure, which aids to cause the pasted parts to adhere together.

The inner faces of the side walls of the chamber are provided with inclined plates or sections $L^a$, the lower margins of which project into the chamber and afford resistance or retardation to the passage of the blanks downwardly through the chamber. As a result said lower margins of the plates or sections $L^a$ serve to support the bundle of blanks or take the weight thereof off the bottom of the chamber, so as to facilitate the ejection of the bottom blank from the chamber in each operation of the machine. As shown in Figs. 8, 11, 12, and 14, said plates or sections $L^a$ are connected yieldingly with the side walls of the chamber, so as to yield outwardly when the plunger is depressed to permit one blank to pass downwardly beyond said plates in each depression of the plunger in position to be acted upon by the pusher or ejector plate, the superincumbent blanks being held by said plates away from the bottom wall of the chamber and out of the way of the pusher-plate. As shown in said figures the plates $L^a$ are held in place in recesses in the walls of the chamber by means of short horizontal rods $L^{14}$, which pass outwardly through bosses $L^{15}$ in the said side walls L and are loosely connected or hinged at their inner ends with said yielding plates. Said rods $L^{14}$ are provided at their outer ends with nuts $L^{16}$, which engage the outer ends of the bosses and limit the inward movement of the plates. $L^{17}$ designates spiral expansively-acting springs which surround the rods inside said bosses and bear inwardly against the plates. Other like springs $L^{18}$, seated in recesses in the inner faces of the walls L, bear inwardly against the lower margins of said yielding plates and act to force said lower margins of the plates inwardly.

In Figs. 30 and 31 is shown a modification of the means for delivering the blanks one at a time into the path of the pusher or ejector plate. As shown in said figures, each wall is provided with a normally stationary oblique plate $L^{19}$, the lower side or margin of which projects obliquely into the chamber. Said plates $L^{19}$ occupy recesses in the side walls of the chamber and are held stationary therein by means of screw-studs $l^{10}$, which are loosely connected at their inner ends with said plates and pass outwardly through apertures in said side walls and are provided at their outer ends with thumb-nuts $l^{11}$. The angles of the plates are adjusted by means of set-screws $l^{12}$, which extend through screw-threaded apertures in said walls and impinge at their inner ends against the upper and lower sides of said plates, in the manner shown in Fig. 31. Said plates $L^{19}$ are provided on their inner faces with pronged holding-strips $L^{20}$, one located at each end of each plate. Said strips are each provided with a plurality of inwardly-projecting prongs $l^{13}$, arranged one above the other, which project inwardly beyond the inner face of the plate to which it is attached and adapted to successively engage the margins of the blanks as they are forced downwardly between the same. As herein shown, said strips are slitted at their lower ends to constitute separate arms, on the lower ends of which the prongs are formed, said arms of each strip being made progressively shorter. Said arms are bent inwardly from the faces of said plates, so as to permit the pronged ends thereof to yield outwardly when the blanks are forced between the same. In the operation of the device the blanks are forced one at a time past each prong and are forced one at a time past the lowermost prong into the path of the pusher or ejector plate. The frictional engagement of the lower part of the oblique plates $L^{19}$ acts to sustain the weight of the bundle of blanks, as in the construction before described, and in each operation of the plunger a blank is forced between the lowermost set of prongs into the path of the pusher or ejector plate, another blank between the second set of prongs upon the lowermost prongs, and another blank is forced past the first set of prongs and arrested by the second set thereof. With the use of the series of prongs past which the blanks are successively forced we are enabled to so keep the blanks separated at the bottom of the chamber as to prevent two or more blanks being delivered into the path of the pusher or ejector plate at one time.

The folding and pressing chamber is provided at its delivery side with blank-releasing devices for preventing more than one blank being delivered to the delivery-rollers at one time. Said releasing devices are made as follows: $L^{21}$ designates a vertically-reciprocating block which is located centrally of the chamber just in rear of the delivery-rollers. Said block is attached to the lower end of an endwise-reciprocatory rod $L^{22}$, which extends through guide-lugs $l^{14} l^{14}$, projecting forwardly from a vertical bar $L^{23}$, depending from the stop-bar $L^3$ centrally between the vertical bars $L^2$, constituting the front wall of the chamber. $l^{15}$ designates a spiral expansively-acting spring which surrounds said rod $L^{22}$ and is interposed between the upper guide-lug $l^{14}$ and a collar $l^{16}$, affixed to the rod $L^{22}$. Said spring acts on said rod to force the lower end of the block against the bottom wall of the chamber. Said block is provided on its rear side with an upwardly and rearwardly inclined surface $l^{17}$, against which the front margin of each blank is forced as it is carried forwardly by the pusher or ejector plate P, and said blank acts on said inclined surface to lift the block and permit the blank to pass beneath the block to the delivery-rollers. A stop-lug $l^{18}$ is attached to the bar $L^{23}$ in position to have contact with the upper end of the rod $L^{22}$ and limit the upward movement of the block, and said stop is so arranged as to permit the block to be raised just sufficiently to permit one blank to pass thereunder. Hence should two blanks be delivered into the path of the pusher or ejector plate the block $L^{21}$ permits the delivery of but one blank. Said stop-lug $l^{18}$ is vertically adjustable on the bar, as shown in Fig. 27, whereby the block $L^{21}$ may be adjusted to permit blanks of varying thicknesses to pass between the same and the bottom wall of the chamber.

In order to keep the blanks of the bundle in the chamber squared, so that the pusher or ejector plate will act upon all alike to deliver the same to the delivery-rollers, a jogging device is provided which is movable in unison with the pusher-plate and acts upon the rear margins of the blanks to maintain the same in vertical alinement. Said jogging device is made as follows: $L^{24} L^{24}$ designate horizontal bars which are attached to the rear ends of the guide-bars $L^{11}$ and move therewith, and therefore move in unison with the pusher-plate. Said bars are bent upwardly and forwardly at their rear ends, as shown in Fig. 8, and to the forward ends of the upturned portions is attached a transverse bar $L^{25}$. $l^{19} l^{19}$ designate short horizontal rods which extend through apertures in the ends of said bar $L^{25}$ from front to rear of the machine, and to the front ends of said rods is attached a transverse vertically-disposed plate $L^{26}$. Attached to the ends of said plate $L^{26}$ are two vertically-disposed jogging-plates $L^{27}$, Figs. 11, 12, and 14, the upper ends of which are curved rearwardly. Said jogging-plates are moved inwardly at each inward movement of the pusher or ejector plate and strike the rear ends of the blanks and serve to keep the bundle of blanks square or straight. The rods $l^{19}$ are adjustable from front to rear of the chamber to suit blanks of different lengths, being for this purpose held adjustably in the transverse bar $L^{25}$ by means of set-screws in the manner shown in Fig. 8.

In order to prevent the pusher-plate pulling a superimposed blank backwardly past the range of the plate in said chamber by reason of frictional contact of said blank with the pusher-plate, we have provided a stationary stop $L^{28}$, Figs. 8, 11, 12, 14, and 20, which is located at the side of the bottom plate $L^6$ in line with the jogging-plates $L^{27}$. Said plate is attached to the forward end of a short horizontal rod $l^{21}$, which extends through an aperture in a short horizontal block $l^{22}$, located in rear of said stop and secured to the rear margin of the side wall of the chamber by a rearwardly-extending rod $l^{23}$, which latter is attached at its front end to said wall of the chamber and extends at its rear end through an aperture in said block $l^{22}$. Said rod $l^{21}$ is held in adjusted relation to the block $l^{22}$ by means of a set-screw, as shown in Fig. 20, whereby the stop may be adjusted from front to rear of the chamber to provide for blanks of different lengths. If in the operation of the pusher-plate a superimposed blank should cling to and be drawn rearwardly by the pusher-plate, the rear edge of said blank will strike said stop, which arrests the rearward movement of the blank in position to be properly engaged by the pusher-plate in the next forward movement thereof.

After the blanks have been pasted, folded, and pressed in the manner described they are delivered upon a receiving-table S, Figs. 1, 2, 3, 22, 23, and 24. Said receiving-table consists, essentially, of a horizontal plate or disk which is rotatively mounted on the forwardly-extending frame $B^3$ of the main frame of the machine. Said plate or disk S is attached to a subjacent supporting frame or spider consisting of inner and outer eccentric rings $s$ $s'$, a central hub $s^2$, and radial arms $s^3$, extending from said hub to the outer ring. The spider is revolubly mounted on an upright pin or stud $S'$, which is rigidly secured in any suitable manner to the frame $B^3$, before mentioned, the pin extending upwardly through the hub of the spider and is horizontally supported on short horizontal rollers $S^a$, Fig. 22, the outer ring $s'$ of the table-frame resting and rolling on said rollers. Said receiving-table is provided on its upper side with a plurality of upright rods $S^2$, which are arranged to form a plurality of separate racks in which the blanks are received. Said rods for this purpose are disposed in sets of three each, arranged in a triangular relation, one located to engage the inner ends of the blanks of each group and the other two located one at each side of said group. As herein shown, six racks are provided, serving to divide the blanks into six separate groups when the table is filled. Means are provided for automatically counting or grouping the blanks which are discharged into each rack. In other words, such mechanism is so constructed and operated that when a predetermined number of blanks have been discharged into each rack and fills the same the table is turned or rotated to bring another one of the racks into position to receive the blanks subsequently to be discharged from the folding and pressing chamber.

T, Figs. 4, 22, and 23, designates a horizontally-swinging detent-lever, which is pivoted on the hub $s^2$ of the supporting ring or spider of the receiving-table below said spider and is provided on its outer end with a spring-pressed pawl $t$, which is adapted for engagement with notches $s^4$, formed in the outer cylindric surface of the inner ring $s$ of said spider. T' designates a link, which is pivoted at one end to said detent-lever between said pawl and said hub and at its other end to a horizontally-sliding block $T^2$, which slides between guides or ways $T^3$, mounted on the frame $B^3$. $T^4$, Figs. 8, 9, and 22, designates an endwise-reciprocatory horizontal bar, which is loosely connected at its forward end to said sliding block $T^2$ and is adapted for operative connection at certain times in the operation of the machine with the lower end of a swinging lever $T^5$, which is herein shown as made integral with the sleeve $Q^4$ on the shaft $Q^5$ and extending downwardly therefrom. Said bar $T^4$ is provided on its lower margin with a downwardly-opening notch $t'$. The lower end of the oscillatory lever $T^5$ is bifurcated and the arms thereof extend on both sides of said bar $T^4$. $t^2$ designates a pin extending between and attached at its ends to said arms of the lever and located below the said bar $T^4$. Said bar $T^4$ is normally held in such position that the lower edge thereof in rear of said notch $t'$ is elevated above the pin $t^2$ of the arm $T^5$, so that at such times said pin does not come in contact with said lower edge of the bar in the backward-and-forward swinging movement of said lever $T^5$, but is free therefrom. The bar $T^4$ is held in its normal elevated position by means of a swinging arm $T^6$, which is pivoted at its upper end to a bar $T^7$, depending from and rigidly connected with a horizontal shaft U, which extends between and is attached at its ends to the side members of the frame at the front thereof. Said swinging arm $T^6$ is located between the endwise-reciprocating bar $T^4$ and a wheel $U'$, mounted on the shaft U, and is provided near its lower end on its outer surface with an upwardly-facing shoulder $t^3$, upon which the bar $T^4$ normally rests. The wheel $U'$ is provided on its side facing the bar $T^4$ with an annular laterally-projecting flange $u$. The bar $T^6$ is provided on its upper edge with a rigid inwardly-extending part $t^4$, which extends toward the wheel $U'$ into the space surrounded by the annular flange $u$ and is located closely adjacent to the inner surface of said flange. Said flange is provided on its inner cylindric surface with a cam projection $u'$, which is adapted when the wheel is turned in the proper position to bring the projection into line with the part $t^4$ of the arm $T^6$ to swing said part upwardly, and thereby swing the lower end of the arm inwardly away from said bar $T^4$ and allow said bar to drop. When this occurs, the bar drops upon the pin $t^2$ of the lever $T^5$, so that when said lever is next swung forwardly the pin $t^2$ passes into the downwardly-opening notch $t'$ of said bar, and in the next backward swing of said lever the bar is carried rearwardly with the lever and acts through the link $T'$, detent-lever $T$, pawl $t$, and notch $s^4$, engaged by said pawl, to turn the receiving-table on its axis a distance to bring another one of the racks in position to receive the blanks subsequently discharged from the chamber. The bar $T^4$ is provided on its lower margin with an inclined surface $t^5$, which when the bar is thrown forwardly in the next forward swing of the arm $T^5$ engages the shoulder $t^3$ of the arm $T^6$ (said arm $T^6$ having in the meantime swung back into a vertical position after the cam projection $u'$ has passed the projection of said arm) and acts to raise said bar upwardly into its elevated position to be held in such position until again released. The means for turning said wheel $U$, whereby the cam projection $u'$ thereof is made to operate on the holding-arm $I^6$, is made as follows: Said wheel $U'$ is provided on its outer surface with a series of ratchet-teeth $u^2$, adapted to be engaged by a spring-pressed pawl $v$, carried on the rear end of a pivoted detent-lever $V$, which is pivoted to the shaft $U$, on which the wheel $U'$ is mounted, as shown in Fig. 9. Said lever $V$ is carried past the shaft, and in front of said lever is pivoted an upwardly and forwardly inclined link $V'$, and said link is pivoted at its upper end to the forward end of an arm or lever $V^2$, which latter is pivoted to the guide-arm of one of the bearings $R'$, in which one of the lower roller-trunnions is mounted. The rear end of said arm $V^2$ is pivotally connected with the adjacent movable bearing-block $R^2$, so that when said block is raised, which occurs when a blank passes between the rollers, the forward end of the lever $V^2$ is depressed. This movement of the arm acts, through the link $V'$, to swing the lever $V$ in a manner to cause the pawl $v$ thereof to turn the wheel $U'$ one step at a time. The link $V'$ has slotted connection with the lever $V^2$, whereby said parts may be adjusted to produce the required movement of the connected detent-lever $V$. As herein shown, the wheel $U'$ is provided with one cam projection $u'$, and the arm $T^6$ is therefore swung but once in each rotation of the wheel to release the bar $T$ and permit the receiving-table to be operated in the manner described. Said wheel $U'$ is rotated at each operation of the actuating devices therefor a distance equal to the distance between two adjacent notches and is operated through said actuating devices at the time when a blank is passed between the rollers and raises the upper roller, as before stated. With this construction, therefore, there will be a number of blanks deposited in each one of the racks equal to the number of ratchet-teeth on the periphery of the wheel $U'$, and after such determined number have been deposited on the table the table-actuating mechanism is operated in the manner described to turn or rotate said table to bring the next succeeding rack into position to receive the blanks thereafter deposited on the table. In this manner a predetermined number of blanks is deposited in each rack of the receiving-table, and said table is thereafter automatically turned, these operations being continued until all of the racks of the table have been completely filled. In order to prevent the wheel $U'$ from turning backwardly when the pawl $v$ is being restored to its normal position after having turned such wheel one step, a click $w$ engages said ratchet-teeth, which click is formed on the end of a swinging arm $W$, which is pivoted on the lower end of a bar $W'$, depending from the cross-bar $L^7$ of the frame. The same device may be operated to deposit a less number of blanks in the racks by providing the wheel $U'$ with two or more cam projections $u'$. Moreover, such variation in the counting mechanism may be effected by varying the number of ratchet-teeth on the wheel $U'$.

In order to lock the receiving-table from turning excepting by the means provided therefor, the following mechanism is provided: $S^4$ designates a spring-pressed dog pivoted to the frame $B^3$ and provided with a tooth $s^6$, which is adapted to engage notches $s^7$, formed on the inner surface of the inner ring $s$ of the receiving-table-supporting frame. Said dog is provided with a rigid arm $s^8$, which is provided with a depending pin $s^9$, adapted for engagement by a cam $T^7$, formed on the outer or free end of a tailpiece of the detent-lever $T$. Said cam is formed with two oppositely-inclined contact-surfaces $t^7$ $t^8$, as shown in Fig. 22. $S^5$ designates a spring-pressed holding pawl or click, which is hinged on the frame $B^3$ and is adapted to engage the notches $s^4$ in the outer surface of the inner ring of the receiving-table-supporting frame. The tooth $s^6$ of the dog is held inwardly out of contact with the inner surface of the ring $s$, and therefore out of contact with the notches $s^7$, when the table is in position to present one of the racks thereof to the discharge-rollers of the folding and pressing chamber. When the detent-lever is swung on its axis to turn or rotate the table, through the medium of the pawl $t$ thereof, the surface $t^7$ of the cam $T^7$, at that time engaged with the pin $s^9$ of said dog, as shown in Fig. 22, acts to hold the tooth $s^6$ of the dog free from the inner surface and notches of the ring until the pin $s^7$ passes upon the opposing surface $t^8$ of the cam and until said cam and the tailpiece move forwardly past said dog, which occurs at the time the detent-lever completes its swinging movement. When said cam is released from the pin $s^9$ of said dog, the spring of the dog acts to throw the tooth of said dog inwardly against the inner surface of the ring $s$, and just as the table completes its angular movement said tooth of the dog is brought into contact with one of the notches $s^7$ on the inner surface of said ring and arrests the movement of said table. The pawl or click $S^5$ also at the completion of the angular movement of the table drops into one of the notches $s^4$ on the outer face of said ring and prevents retractive movement of the table. When the detent-lever is restored to its normal position, as shown in Fig. 22, the engagement of the cam $T^7$ with the pin $s^9$ of the dog acts to free the dog from the adjacent notch $s^7$, and thereby permit said table to freely turn or rotate in the next movement of the detent-lever.

The plunger $D^5$ is adapted to be varied in width to correspond with the variations in width of the folding and pressing chamber. For this purpose said plunger is shown as provided with side sections $D^{12}$, having short inwardly-extending rods $d^{12}$, adapted to pass through the side flanges of the plunger and enter apertured lugs $d^{13}$ on the top of the plunger, as shown in Fig. 3. The rods are held in adjusted relation with respect to said lugs, and the side sections of the plunger adjusted by means of set-screws $d^{14}$, which extend through screw-threaded openings in said lugs and impinge upon said rods. If desired, two or more sets of side sections $D^{12}$ may be provided for the plunger, having rods $d^{12}$ of different lengths.

It is obvious that many changes may be made in the structural details without departing from the spirit of the invention, and we do not wish to be limited to such details except as hereinafter made the subject of specific claims.

We claim as our invention—

1. A machine for folding and pasting box-blanks, comprising feeding mechanism, pasting mechanism, an open-topped folding and pressing chamber over which the blanks are delivered by said feeding mechanism, means for forcing said blanks into said chamber to fold upwardly the marginal parts of said blank, means for folding inwardly said marginal parts of the blank to bring the edges thereof together, and means acting in each operation of the folding devices for ejecting from the bottom of said chamber the folded and pasted blanks.

2. A machine for folding and pasting box-blanks, comprising feeding mechanism, pasting mechanism, a deep, open-topped folding and pressing chamber over which the blanks are delivered by said feeding mechanism, said chamber being adapted to contain a mass of blanks arranged in superposed relation, means for forcing the blanks into the top of said chamber upon said mass of blanks to fold upwardly the marginal parts of the blanks, means for folding inwardly the marginal parts of the blanks to bring the edges thereof together, and means acting in each operation of the folding devices for ejecting from the chamber the bottom blank of the mass.

3. A machine for folding and pasting box-blanks, comprising feeding mechanism, pasting mechanism, an open-topped folding and pressing chamber over which the blanks are delivered by said feeding mechanism, means for forcing the blanks into said chamber to fold upwardly the marginal parts of the blanks, swinging folding-fingers adapted to project laterally into the top of said chamber, means for moving said fingers bodily toward and away from said chamber and for swinging the inner ends thereof downwardly to fold inwardly the marginal parts of the blanks, and means for ejecting from the bottom of said chamber the folded and pasted blanks.

4. A machine for folding and pasting box-blanks comprising feeding mechanism, pasting mechanism, an open-topped folding and pressing chamber over which the blanks are delivered by said feeding mechanism, a vertically-reciprocatory plunger for forcing said blanks into said chamber to fold upwardly the marginal parts of said blanks, swinging folding-fingers adapted to project laterally into the upper parts of said chamber, means for moving said fingers bodily toward and away from the chamber and for swinging the inner ends thereof downwardly to fold inwardly said marginal parts of the blank, and means for ejecting from the bottom of said chamber the folded and pasted blanks.

5. In a machine for the purpose set forth, the combination with the folding and pressing chamber, of a reciprocating plunger which enters the open end of said chamber, pivoted folding-fingers which are adapted to project laterally into said chamber near the open end thereof, and means for moving said folding-fingers laterally toward and from the chamber, and for swinging the inner ends thereof vertically.

6. In a machine for the purpose set forth, the combination with the folding and pressing chamber, of a plunger adapted to enter the open end of said chamber, vibratory folding-fingers adapted to be projected laterally into said chamber near the open end thereof, rock-shafts to which said fingers are attached, laterally-extending slotted bearings in which said rock-shafts are supported, means for moving said fingers toward and away from said chamber, and means for swinging said fingers on their axis of vibration.

7. A machine for folding and pasting box-blanks comprising folding mechanism, pasting mechanism, an open-topped folding and pressing chamber, over which the blanks are delivered by said feeding mechanism, a reciprocating plunger for forcing the blanks into the said chamber to fold the marginal parts thereof upwardly between said plunger and the side walls of the chamber, means adapted to engage the blanks to prevent withdrawal thereof from the chamber in the retraction of said plunger, means for folding inwardly said marginal parts of the blank and means for ejecting the blanks from the bottom of said chamber.

8. A machine for folding and pasting box-blanks, comprising feeding mechanism, pasting mechanism, an open-topped folding and pressing chamber over which the blanks are delivered by said feeding mechanism, a vertically-reciprocatory plunger for forcing the said blanks into the said chamber to fold upwardly the marginal parts thereof between said plunger and the side walls of the chamber, projections on the inner surfaces of the chamber-walls adapted to engage the upwardly-folded marginal parts of the blank to prevent withdrawal of the same in the retraction of the plunger, means for folding inwardly said marginal parts of the blanks, and means for ejecting from the chamber the folded and pasted blanks.

9. A machine for folding and pasting box-blanks, comprising feeding mechanism, pasting mechanism, an open-topped folding and pressing chamber over which the blanks are delivered by said feeding mechanism, said chamber being adapted to contain a mass of blanks arranged in superposed relation, means for forcing said blanks into said chamber to fold upwardly the marginal parts of said blanks, means for folding inwardly said marginal parts of the blanks, and a horizontally-movable pusher-plate in the bottom of said chamber for ejecting the lowermost blank of the mass in each operation of the machine.

10. A machine for folding and pasting box-blanks, comprising feeding mechanism, pasting mechanism, an open-topped folding and pressing chamber over which the blanks are delivered by said feeding mechanism said chamber being adapted to contain a mass of blanks arranged in superposed relation, means for forcing said blanks into said chamber to fold upwardly the marginal parts of said blanks, means for folding inwardly said marginal parts of the blanks, means located near the bottom of the side walls of the chamber for sustaining the mass of blanks therein independently of the bottom wall of the chamber, and a horizontally-movable pusher-plate in the bottom of said chamber for ejecting the lowermost blank of the mass in each operation of the machine.

11. A machine for folding and pasting box-blanks, comprising folding mechanism, pasting mechanism, a deep, open-topped folding and pressing chamber over which the blanks are delivered by said feeding mechanism, said chamber being provided with upright side walls and being adapted to contain a mass of blanks arranged in superposed relation, means for forcing blanks into the said chamber upon the mass of blanks therein to fold upwardly the marginal parts of the blanks, means for folding inwardly said marginal parts of the blanks, plates attached to the inner surfaces of said side walls of the chamber, the lower edges of which plates extend obliquely into the chamber, and means acting in each operation of the folding devices for ejecting from the chamber the bottom blank of said mass.

12. In a machine of the character set forth, the combination with the folding and pressing chamber adapted to contain a mass of blanks arranged in superposed relation, means for forcing said blanks into said chamber upon the mass of blanks therein and for folding and pressing said blanks, plates attached to the inner faces of the side walls of the chamber, the lower edges of which plates extend obliquely into the chamber, spring-pressed prongs on the lower parts of said plates which project into the chamber beyond the plates, and a horizontally-movable pusher-plate in the bottom of the chamber for ejecting in each operation of the machine the lowermost blank of the mass from said chamber.

13. In a machine for the purpose set forth the combination with a folding and pressing chamber adapted to contain a mass of blanks arranged in superposed relation, means for forcing said blanks into said chamber upon the mass of blanks therein, and for folding and pressing said blanks, plates attached to the inner faces of said side walls of the chamber, the lower edges of which plates extend obliquely into the chamber, each of said plates being provided near its lower edge with two or more inwardly-extending yielding prongs, the prongs of each set being located one above the other, and a horizontally-movable pusher-plate in the bottom of said chamber for ejecting in each operation of the machine the lowermost blank of the mass from the chamber.

14. In a machine for the purpose set forth the combination with the feeding and pressing chamber adapted to contain a mass of blanks arranged in superposed relation, means for forcing said blanks into said chamber upon the mass of blanks therein and for folding and pressing said blanks, plates attached to the inner faces of the side walls of the chamber, the lower edges of which extend obliquely into the chamber, means for moving the lower edges of said plates toward and from each other, and means acting in each operation of the machine for ejecting from the chamber the bottom blank of the mass.

15. A machine for folding and pasting box-blanks comprising folding mechanism, pasting mechanism, a deep open-topped folding and pressing chamber over which the blanks are delivered by said feeding mechanism, said chamber being adapted to contain a mass of blanks arranged in superposed relation, means for forcing said blanks into the chamber upon said mass of blanks therein to fold upwardly the marginal parts of the blanks, means for folding inwardly said marginal parts of the blanks, a movable pusher-plate in the bottom of said chamber, and coacting rollers at the side of said chamber in front of the pusher-plate adapted to receive in each operation of the machine the bottom blank of said mass which is advanced toward the rollers by said pusher-plate.

16. In a machine for the purpose set forth the combination with the folding and pressing mechanism adapted to contain a mass of blanks arranged in superposed relation, of means for forcing said blanks into the chamber upon the mass of blanks therein and for folding and pressing said blanks, a horizontally-movable pusher-plate in the bottom of said chamber, and coacting rollers at the side of said chamber in front of the pusher-plate adapted to receive in each operation of the machine the bottom blank of said mass which is advanced toward the rollers by said pusher-plate.

17. In a machine for the purpose set forth the combination with the pressing and folding chamber which is adapted to contain a mass of superposed blanks, of means for forcing into said chamber the blanks and for folding and pressing said blanks, a pusher-plate in the bottom of said chamber, coacting rollers at the side of said chamber in front of the pusher-plate adapted to receive, in each operation of the machine, the bottom blank of said mass, which is advanced toward said rollers by the pusher-plate, and a releasing device at the rear of said rollers constructed to release a single blank at a time.

18. In a machine for the purpose set forth the combination with the folding and pressing chamber adapted to contain a mass of blanks in superposed relation, of means for forcing the blanks into said chamber and for folding and pressing said blanks, a pusher-plate located in the bottom of said chamber, coacting rollers at the side of said chamber in front of the pusher-plate adapted to receive, in each operation of the machine, the bottom blank of said mass which is advanced toward the rollers by said pusher-plate, a releasing device resting on the bottom of said chamber in the rear of said rollers comprising a vertically-movable block provided on its rear surface with an inclined face adapted to be engaged by the forward margins of said blanks and a stop for limiting the vertical movement of said block.

19. In a machine for the purpose set forth the combination with the folding and pressing chamber adapted to contain a mass of blanks in superposed relation, of means for forcing said blanks into said chamber and for folding and pressing said blanks, a pusher-plate in the bottom of said chamber, coacting rollers at the side of said chamber in front of the pusher-plate adapted to receive, in each operation of the machine, the bottom blank of said mass which is advanced toward the rollers by said pusher-plate, a releasing device in the rear of said rollers comprising a vertically-movable block resting on the bottom of said chamber and provided on its rear surface with an inclined face adapted to be engaged by the forward margins of said blanks, a stop for limiting the vertical movement of said block, and means for adjusting said stop to provide a greater or less extent of movement in the block.

20. In a machine for the purpose set forth, the combination with a folding and pressing chamber adapted to contain a mass of blanks in superposed relation, of means for forcing said blanks into the chamber and for folding and pressing said blanks, a pusher-plate in the bottom of said chamber, coacting rollers located at the side of the chamber in front of the pusher-plate and adapted to receive, in each operation of the machine, the bottom blank of said mass which is advanced toward the rollers by means of said pusher-plate, and a releasing device located in rear of said rollers comprising a vertically-movable block provided on its rear surface with an inclined surface adapted to be engaged by the forward margins of the blanks, a rod attached to said block and extending through apertured lugs on the chamber-wall, a spring applied to said rod to force said block against the bottom of said chamber, and a stop adapted to limit the vertical movement of said block.

21. In a machine for the purpose set forth the combination with a folding and pressing chamber adapted to contain a mass of blanks in superposed relation, of means for forcing said blanks into said chamber upon the mass of blanks therein and to fold and press said blanks, a pusher-plate in the bottom of said chamber, coacting rollers at one side of said chamber in front of the pusher-plate, means for separately feeding the blanks from the bottom of said mass into the path of said pusher-plate, and a releasing device located in rear of said rollers constructed to release one blank at a time from said chamber as it is advanced toward the rollers by said pusher-plate.

22. In a machine for the purpose set forth the combination with the folding and pressing chamber, adapted to contain a mass of blanks arranged in superposed relation, means for folding the blanks therein, a pusher-plate located in the bottom of said chamber, and means for separately feeding the lowermost blank of the mass of said blanks into the path of the pusher-plate in each operation of the machine.

23. In a machine for the purpose set forth, the combination with the pressing and folding chamber adapted to contain a mass of blanks arranged in superposed relation, of means adapted to force the blanks into said chamber and fold the same, plates on the inner faces of the walls of said chamber the lower edges of which extend obliquely into the chamber and which are provided at their lower edges with spring-pressed prongs, and means located below said plates for ejecting from the bottom of said chamber, the lowermost blank of the mass after it is forced downwardly between said prongs.

24. A machine for folding and pasting box-blanks comprising feeding mechanism, pasting mechanism, an open-topped folding and pressing chamber over which the said blanks are delivered by said feeding mechanism, means for forcing said blanks into said chamber and for folding and pressing the same therein, means for ejecting from the bottom of said chamber the folded and pasted blanks, a stop-plate located at the upper front part of the chamber against which the front margins of the blanks strike when delivered over the chamber, and means for adjusting said stop-plate in a direction from front to rear of the chamber.

25. A machine for folding and pasting box-blanks comprising feeding mechanism, pasting mechanism, an open-topped folding and pressing chamber over which the said blanks are delivered by said feeding mechanism, means for forcing said blanks into the chamber and for folding and pressing the blanks, means for ejecting from the bottom of said chamber the folded and pasted blanks, a stop-plate located at the upper front part of the chamber against which the front margins of the blanks strike when delivered over the chamber, means for adjusting said stop-plate in a direction from front to rear of the chamber, and depending bars attached at their upper ends to said stop-plates and extending across the front of the chamber.

26. In a machine for the purpose set forth, the combination with a folding and pressing chamber, of means for forcing the blanks into said chamber to fold upwardly the marginal parts of the blanks, vibratory folding-fingers adapted to project laterally into the said chamber and movable bodily toward and away from said chamber, actuating-rods operatively connected at their upper ends with said folding-fingers, and means for imparting both endwise and lateral movement to said actuating-rods.

27. In a machine for the purpose set forth, the combination with a folding and pressing chamber, of means for forcing the blanks into said chamber to fold upwardly the marginal parts of said blank, vibratory folding-fingers adapted to project laterally into the top of said chamber and movable bodily toward and away from said chamber, actuating-rods operatively connected at their upper ends with said folding-fingers, rotative cams provided with cam-grooves in their peripheries and also on their side faces, horizontally-vibratory levers pivoted to the machine and provided with cam-studs adapted to engage the peripheral grooves of the cams, means for connecting said levers with said actuating-rods and parts to which said actuating-rods are pivoted at their lower ends provided with studs adapted to engage the cam-grooves in the side faces of the cams.

28. In a machine for the purpose set forth, the combination with an open-topped folding and pressing chamber having upright side walls over which the blanks are delivered, means for forcing the blanks into said chamber to fold upwardly the marginal parts thereof, vibratory folding-fingers adapted to project laterally into the top of said chamber and movable bodily toward and away from said chamber, actuating mechanism for said folding-fingers comprising rotative cams having cam-grooves in their peripheries and also in their side faces and actuating-rods operatively connected at their upper ends with said fingers and connected with parts at their lower ends having studs which engage said peripheral and side grooves of the cams, said side walls of the chamber being movable toward and away from each other to adjust the same to blanks of varying width, and the actuating mechanism for the fingers being connected and movable with said side walls.

29. The combination with a machine for folding and pressing box-blanks, of a movable receiving-table provided with a plurality of racks into which the blanks are deposited from the machine, actuating mechanism for said table, a discharging mechanism consisting of coacting rollers one of which is bodily movable each time a blank is discharged from the machine, and operative connections between the movable roller and the actuating mechanism for the table, embracing a counting device.

30. The combination with a machine for folding and pasting box-blanks provided with a discharging mechanism embracing coacting rollers, one of which is yielding to permit the blanks to pass therebetween, of a receiving-table provided with a plurality of racks into which the blanks are discharged in groups from the discharging mechanism of the machine, operative connections between said yielding roller and the actuating mechanism of the table, embracing a counting mechanism for advancing said table after each rack has been filled.

31. The combination with a machine for folding and pasting box-blanks having a discharging mechanism embracing coacting rollers, one of which is yielding to permit the blanks to pass therebetween, of a receiving-table provided with a plurality of racks into which the blanks are adapted to be deposited in groups, mechanism for turning or rotating said receiving-table, and means for setting said table-actuating mechanism into operation comprising a rotative wheel provided with an annular series of ratchet teeth or notches, means operatively connected with the movable roller for rotating the wheel step by step as the blanks are discharged between said rollers, and means on said wheel acting on the table-actuating mechanism to start said table-actuating means in operation.

32. The combination with a machine for folding and pasting box-blanks provided with a discharge mechanism having a part which is moved as each blank is discharged from the machine, of a receiving-table provided with a plurality of racks into which the blanks are deposited in groups, means for advancing said receiving-table embracing a pawl-and-ratchet mechanism, an endwise-movable bar operatively connected therewith, an oscillatory lever adapted for operative connection with said endwise-reciprocatory bar, means for holding said bar out of operative connection with said oscillatory lever and means for releasing said holding means to permit the bar to be operatively connected with said lever at determinate periods in the operation of the machine, embracing a counting device which is operatively connected with the movable part of the discharging mechanism.

33. The combination with a machine for folding and pasting box-blanks provided with a discharging mechanism, of a receiving-table provided with a plurality of racks into which the blanks are deposited from said machine, mechanism for actuating said table comprising a pawl-and-ratchet mechanism, an endwise-reciprocatory bar connected therewith, an oscillatory lever adapted at determinate periods in the operation of the machine for operative connection with said bar, means for holding said bar normally out of operative connection with said lever, a rotary wheel or disk, operative connections between said wheel or disk and the discharge mechanism of the machine, whereby said wheel or disk is rotated step by step as the blanks are discharged from the machine, and means on the disk for releasing the holding means for said bar to permit the latter to be operatively connected with said oscillatory lever.

34. The combination with a machine for folding and pasting box-blanks provided with a discharge mechanism, of a table provided with a plurality of racks in which the blanks are deposited, mechanism for turning said table embracing a pawl-and-ratchet mechanism, an endwise-reciprocatory bar connected at one end therewith, an oscillatory lever on the machine adapted to be operatively connected with said reciprocatory bar, a swinging arm provided with a shoulder on which said bar normally rests and which holds said bar out of operative connection with said oscillatory lever, a rotative wheel or disk, operative connections between said wheel and the discharge mechanism of the machine whereby said wheel or disk is rotated step by step as the blanks are discharged from the machine, and means on said wheel or disk for swinging said holding-arm away from the reciprocatory bar to permit the latter to become operatively connected with said oscillatory lever.

35. The combination with a machine for folding and pasting box-blanks, of a revolving receiving-table provided with a plurality of racks into which the blanks are adapted to be deposited in groups, of mechanism for turning said table step by step comprising an annular ring attached to the lower side of the table, a swinging detent-lever provided with a pawl adapted to engage notches in said ring, a stop-dog actuated by a cam on said lever for stopping said table at the end of its step-by-step movement, and operative connections between said detent-lever and the discharge mechanism of the machine, whereby said lever is automatically operated to turn the table after a predetermined number of blanks have been deposited in each rack.

36. In a machine for the purpose set forth, the combination with the revolving receiving-table provided on its under surface with a concentric ring, a detent-lever pivoted concentrically with respect to said ring and provided with a pawl which is adapted to engage a series of notches in said ring, means for swinging said detent-lever, a tailpiece on said detent-lever, a stop-dog adapted to engage other notches in said ring, and a cam on said tailpiece adapted to act on said dog to free the same from said notches when the lever is swung to rotate the table, said cam being, in the continued movement thereof, released from the dog to permit the latter to engage one of said notches to arrest the movement of the table.

37. In a machine for the purpose set forth, the combination with the revolving receiving-table provided on its under surface with a concentric ring, a detent-lever pivoted concentrically with respect to said ring and provided with a pawl which is adapted to engage a series of notches in said ring, means for swinging said detent-lever, a tailpiece on said detent-lever, a stop-dog adapted to engage other notches in said ring, a cam on said tailpiece adapted to operate on said dog to free the same from the notches in said ring when the lever is swung to rotate the table, said cam in the continued movement thereof being released from the dog to permit the latter to engage one of said notches to arrest the movement of the table and means acting to prevent backward movement of the said table.

38. A machine for folding and pasting box-blanks comprising a folding and pressing chamber, means for folding and pressing said blanks in said chamber, intermittently-actuated forwarding mechanism for advancing the blanks to said folding and pressing chamber and means for detaining a blank in said forwarding mechanism while the folding and pressing mechanism is in operation.

39. A machine for folding and pasting box-blanks comprising folding and pressing mechanism and means for advancing the blanks to said folding and pressing mechanism comprising upper and lower carrier-belts which frictionally engage the upper and lower surfaces of the margins of the blanks, means for arresting the blanks between said carrier-belts during the operation of the folding mechanism, means preventing the introduction of a blank to the carrier-belts when a blank is held or arrested between said belts, and pasting mechanism for applying paste to the blanks.

40. A machine for folding and pasting box-blanks comprising feeding mechanism, pasting mechanism, folding and pressing mechanism, stop-plates located one at the receiving end of the feeding mechanism and the other at the rear of the folding and pressing mechanism, and means for raising and lowering said stop-plates into and out of the path of said blanks.

41. A machine for folding and pasting box-blanks comprising feeding mechanism, pasting mechanism, mechanism for folding and pressing said blanks, a feed-board located at the rear of the feeding mechanism, stop-plates located one between said feed-board and the feeding mechanism and the other at the rear of the folding and pressing mechanism, oscillatory arms to which said stop-plates are attached, a rotary cam and operative connections between said rotary cam and oscillatory arm for raising and lowering said stop-plates into and out of the path of the blanks.

42. A machine for folding and pasting box-blanks comprising feeding mechanism, pasting mechanism, a folding and pressing chamber located in advance of the pasting mechanism, said feeding mechanism comprising upper and lower endless tapes, and said lower tapes extending on either side of said chamber, and the upper ones of which terminate in rear of said chamber, and stop-plates adapted to be moved upwardly between said tapes into the path of said blank, one of said stop-plates being located in rear of the feeding mechanism, and the other located between the upper belt of the feeding mechanism, and the said chamber.

43. A machine for folding and pasting box-blanks comprising feeding mechanism, pasting mechanism, a folding and pressing chamber located in advance of the pasting mechanism, said feeding mechanism comprising upper and lower endless tapes or belts, the adjacent laps of which coöperate to frictionally engage the blanks for carrying the same through the machine, said upper belts terminating in rear of said chamber, and the lower belts passing one on each side of said chamber to deliver the blanks over said chamber, a vertically-reciprocatory plunger for forcing the blanks into the chamber to fold the marginal parts thereof upwardly, and means for folding inwardly said marginal parts of the blanks.

44. A machine for folding and pasting box-blanks comprising folding and pressing mechanism, feeding mechanism for advancing the blanks to the folding and pressing mechanism, embracing upper and lower endless tapes which frictionally engage the upper and lower surfaces of the marginal parts of the blanks, guide-bars located outside of said tapes adapted for engagement with the margins of the blanks, means for moving said upper and lower tapes toward and from each other to adjust the same to varying widths of blanks and means for correspondingly varying the width of the space between said guide-bars.

45. A machine for folding and pasting box-blanks comprising pressing mechanism, feeding mechanism for advancing the blanks to the folding and pressing mechanism embracing upper and lower tapes adapted to frictionally engage the upper and lower surfaces of the marginal parts of the blanks, a rotary paste-disk located at one side of said upper and lower tapes for applying paste to the paste-flap of the blank, means for moving said tapes toward and away from each other to adjust the same to varying widths of blanks and for giving corresponding movement to said paste-wheel.

46. A machine for folding and pasting box-blanks comprising folding and pressing mechanism, feeding mechanism for advancing the blanks to the folding and pressing mechanism, embracing upper and lower endless tapes adapted to frictionally engage the upper and lower surfaces of the margins of the blank, the lower tapes extending one on each side of the folding and pressing mechanism, and the upper tapes terminating in rear of said folding and pressing mechanism, longitudinal guides located outside of said tapes and adapted to engage the side margins of the blanks, and downwardly-facing shoulders on said guides in front of said upper tapes, adapted to frictionally engage the upper surfaces of the blanks.

47. A machine for folding and pasting box-blanks comprising folding and pressing mechanism, feeding mechanism for advancing the blanks to the folding and pressing mechanism comprising upper and lower tapes which frictionally engage the upper surfaces of the blanks, rollers about which said tapes are trained, said lower tapes extending one on each side of the folding and pressing mechanism, and the upper tapes terminating in advance of said folding and pressing mechanism, longitudinal guide-bars arranged at each side of said tape adapted to engage the side margins of the blank, a transverse stop-bar at the front part of said folding and pressing mechanism, and a gage adapted to engage one corner of the blank and located just in rear of said transverse stop-bar.

48. In a machine for folding and pasting box-blanks, the combination with a folding and pressing chamber adapted to contain a mass of blanks in superposed relation, of means for forcing the blanks into said chamber upon said mass of blanks therein and for folding and pressing said blanks, a pusher-plate in the bottom of said chamber for separately ejecting the lowermost blank of the series from the chamber in each operation of the machine, and a jogging device at the rear of said chamber adapted to reciprocate toward and from the blanks and engage the rear margins thereof to maintain the rear end of said mass of blanks squared.

49. In a machine for folding and pasting box-blanks, the combination with a folding and pressing chamber adapted to contain a mass of blanks in superposed relation, of means for forcing the blanks into said chamber upon said mass of blanks therein and for folding and pressing said blanks, a pusher-plate in the bottom of said chamber for separately ejecting the lowermost blanks of the series from the chamber in each operation of the machine, and a jogging device at the rear of said chamber movable with said pusher-plate and adapted to reciprocate toward and from the blanks and engage the rear margins thereof to maintain the rear end of said mass of blanks squared.

50. In a machine for folding and pasting box-blanks the combination with a folding and pressing chamber, of means for forcing the blanks into said chamber upon the mass of blanks therein and for folding and pressing said blanks, a pusher-plate in the bottom of said chamber for separately ejecting the lowermost blank of the series from the chamber in each operation of the machine, and a stop located at one side of the pusher-plate and adapted for engagement with the rear margins of the lowermost blanks to prevent said plate from drawing the lowermost blank rearwardly out of the range of said pusher-plate.

In testimony that we claim the foregoing as our invention we affix our signatures, in presence of two witnesses, this 13th day of December, A. D. 1901.

ROY J. CARRIER.
JOHN W. LOW.

Witnesses:
WILLIAM L. HALL,
GERTRUDE BRYCE.